(12) United States Patent
  Sheikholeslami et al.

(10) Patent No.: US 12,576,544 B2
(45) Date of Patent: Mar. 17, 2026

(54) METHOD AND APPARATUS FOR AN ADAPTABLE SUCTION DEVICE

(71) Applicant: Nexera Robotics Corp., Vancouver (CA)

(72) Inventors: Sepehr Sheikholeslami, Vancouver (CA); Carlo Menon, Coquitlam (CA); Jingyang Peng, Saskatoon (CA)

(73) Assignee: Nexera Robotics Corp., Vancouver (CA)

( * ) Notice: Subject to any disclaimer, the term of this patent is extended or adjusted under 35 U.S.C. 154(b) by 1010 days.

(21) Appl. No.: 17/754,769

(22) PCT Filed: Nov. 12, 2020

(86) PCT No.: PCT/US2020/060308
  § 371 (c)(1),
  (2) Date: Apr. 12, 2022

(87) PCT Pub. No.: WO2021/097145
  PCT Pub. Date: May 20, 2021

(65) Prior Publication Data
  US 2022/0379494 A1     Dec. 1, 2022

Related U.S. Application Data

(60) Provisional application No. 63/038,806, filed on Jun. 13, 2020, provisional application No. 62/933,647, filed on Nov. 11, 2019.

(51) Int. Cl.
  B25J 15/06     (2006.01)
  B25J 15/00     (2006.01)
(52) U.S. Cl.
  CPC ....... B25J 15/0616 (2013.01); B25J 15/0023 (2013.01)

(58) Field of Classification Search
  CPC .... B25J 15/0616; B25J 15/0023; B65G 47/91
  See application file for complete search history.

(56) References Cited

U.S. PATENT DOCUMENTS 3,245,710 A      4/1966  Begemann
4,561,686 A  *  12/1985  Atchley ................ B66C 1/0231
                                            294/188
(Continued)

FOREIGN PATENT DOCUMENTS

CN        105798940 A    7/2016
CN        106466849 A    3/2017
(Continued)

OTHER PUBLICATIONS

European Search report issued by the European Patent Office in relation to EP Application No. 20886980.0 dated Dec. 15, 2022, 9 pages.
(Continued)

*Primary Examiner* — Stephen A Vu
(74) *Attorney, Agent, or Firm* — Schwabe, Williamson & Wyatt, P.C.

(57)     ABSTRACT

The present invention will provide a suction device adapted to provide gripping and suction forces to pick up and move a wide variety of objects. This is accomplished through a suction compartment, a membrane compartment, deformable membrane sealing said membrane compartment, and at least one pressure mechanism. The at least one pressure mechanism is in fluid connection with the suction compartment and is configured to modify properties within the suction compartment to assist in providing gripping and attractive forces. The present invention will grasp an object by positioning the deformable membrane adjacent to said object, modifying the deformable membrane to conform to and create a seal with said object, and then depressurizing the suction compartment via the pressure mechanism, pro-
(Continued)

viding a suction force onto said object within that sealed area sufficient to grasp said object.

26 Claims, 18 Drawing Sheets

(56) References Cited

U.S. PATENT DOCUMENTS

| | | | |
|---|---|---|---|
| 6,502,877 B2 | 1/2003 | Schick et al. | |
| 6,846,029 B1 | 1/2005 | Ragner et al. | |
| 7,293,750 B2 | 11/2007 | Richter | |
| 7,409,812 B2 | 8/2008 | Gilmore et al. | |
| 7,452,017 B2 | 11/2008 | Maffeis | |
| 7,992,908 B2 | 8/2011 | Finck | |
| 8,096,537 B2 | 1/2012 | Browne et al. | |
| 8,882,165 B2* | 11/2014 | Lipson | B25J 15/12 |
| | | | 294/188 |
| 9,120,230 B2 | 9/2015 | Lipson et al. | |
| 9,308,650 B2 | 4/2016 | Eisele et al. | |
| 9,339,945 B2 | 5/2016 | Parness et al. | |
| 9,505,955 B1 | 11/2016 | Krahn et al. | |
| 9,623,570 B1 | 4/2017 | Krahn et al. | |
| 10,087,020 B1* | 10/2018 | Ruiz | B25J 15/0616 |
| 10,335,956 B2 | 7/2019 | Grey | |
| 10,569,422 B2* | 2/2020 | Curhan | B25J 15/0023 |
| 11,077,564 B1 | 8/2021 | Polido et al. | |
| 2010/0054903 A1 | 3/2010 | Jones et al. | |
| 2010/0217436 A1 | 8/2010 | Jones et al. | |
| 2013/0106127 A1 | 5/2013 | Lipson et al. | |
| 2015/0272749 A1* | 10/2015 | Amend, Jr. | A61F 2/588 |
| | | | 623/64 |
| 2017/0072572 A1 | 3/2017 | Wagner et al. | |
| 2018/0015618 A1 | 1/2018 | Nadler et al. | |
| 2019/0047156 A1 | 2/2019 | Curhan et al. | |
| 2019/0217481 A1 | 7/2019 | Lessing et al. | |
| 2019/0217482 A1 | 7/2019 | Ishida et al. | |
| 2019/0217486 A1 | 7/2019 | Takahashi et al. | |
| 2019/0217487 A1 | 7/2019 | Takahashi et al. | |

FOREIGN PATENT DOCUMENTS

| | | | |
|---|---|---|---|
| CN | 109789564 A | 5/2019 | |
| CN | 110370308 A | 10/2019 | |
| DE | 102012012289 A1 | 12/2012 | |
| DK | 179475 | 11/2018 | |
| EP | 1731452 | 4/2008 | |
| EP | 2415696 A1 | 2/2012 | |
| EP | 3248738 | 11/2017 | |
| JP | 2012176476 A1 | 9/2012 | |
| JP | 2018149639 A | 9/2018 | |
| JP | 2018149640 A | 9/2018 | |
| WO | 2006082100 | 8/2006 | |
| WO | 2011130475 A2 | 10/2011 | |
| WO | 2011135450 A1 | 11/2011 | |
| WO | 2012093932 | 7/2013 | |
| WO | 2015006613 A1 | 1/2015 | |
| WO | 2015123128 | 8/2015 | |
| WO | 2015123128 A1 | 8/2015 | |
| WO | 2016146140 | 8/2017 | |
| WO | 2019065120 A1 | 4/2019 | |
| WO | 2019075464 | 4/2019 | |
| WO | 2021097145 A1 | 5/2021 | |

OTHER PUBLICATIONS

PCT International Search Report for PCT/US2020/060308 dated Dec. 21, 2020.

PCT Written Opinion of the International Searching Authority for PCT/US2020/060308 dated Dec. 21, 2020.

China National Intellectual Property Administration, Office Action issued in CN Application No. 202080038031.X, issued Feb. 29, 2024, 20 pages with English machine translation.

Canadian Intellectual Property Office International Searching Authority (ISA/CA), Written Opinion of the International Searching Authority issued in PCT/CA2023/051650 mailed Mar. 5, 2024, 9 pages.

European Patent Office, Office Action in EP Application No. 20886980.0, dated Sep. 3, 2024, 6 pages.

China National Intellectual Property Administration, Notice of Allowance issued in CN Application No. 202080038031.X, issued Sep. 20, 2024, 6 pages with English translation.

Japan Patent Office, Notice of Reason(s) for Rejection in JP Application No. 2021-575928, mailed Nov. 5, 2024, 15 pages with translation.

Japan Patent Office, Notice of Reason(s) for Rejection in JP Application No. 2021-575928, mailed May 20, 2025, 5 pages with translation.

* cited by examiner

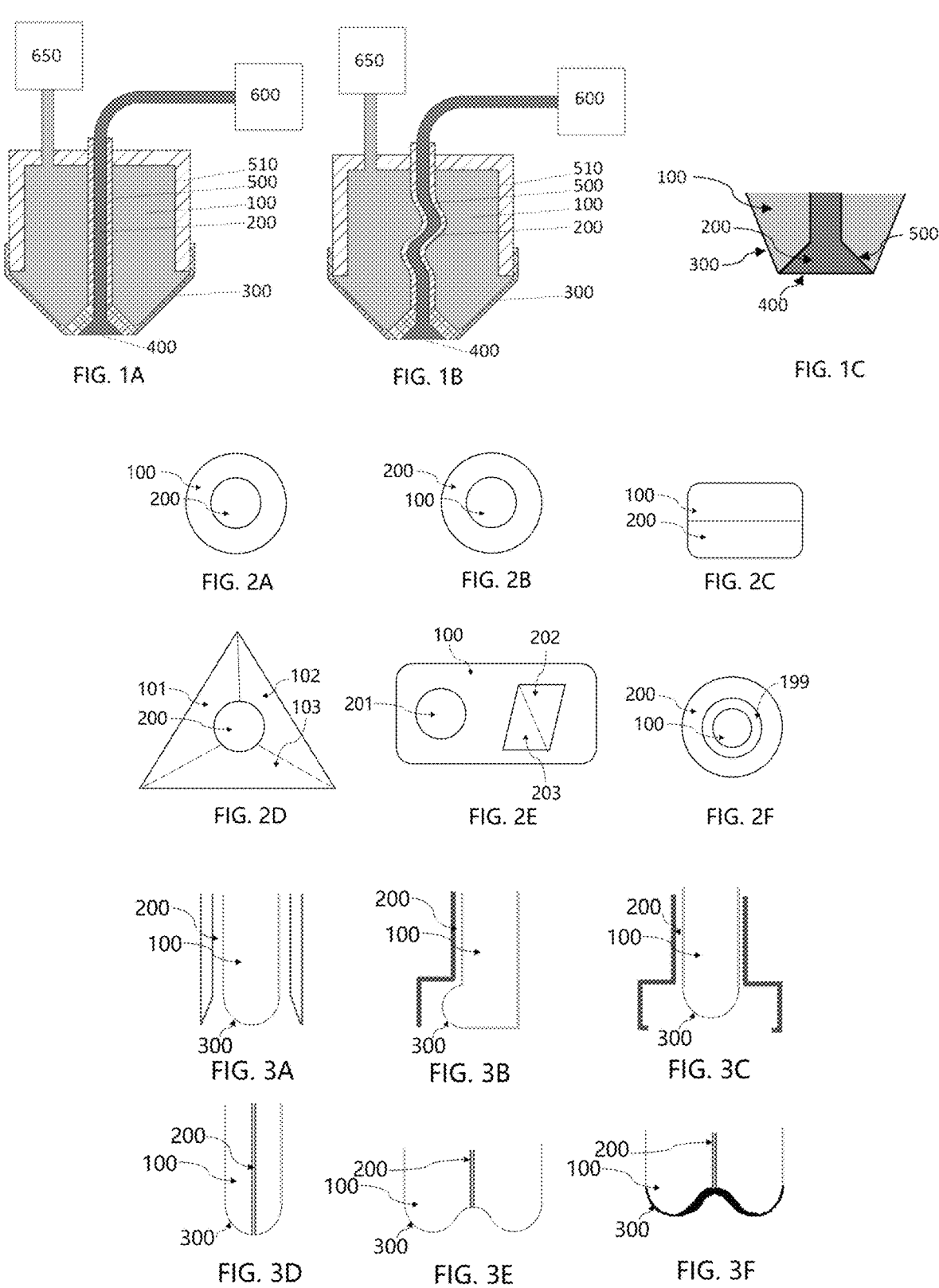

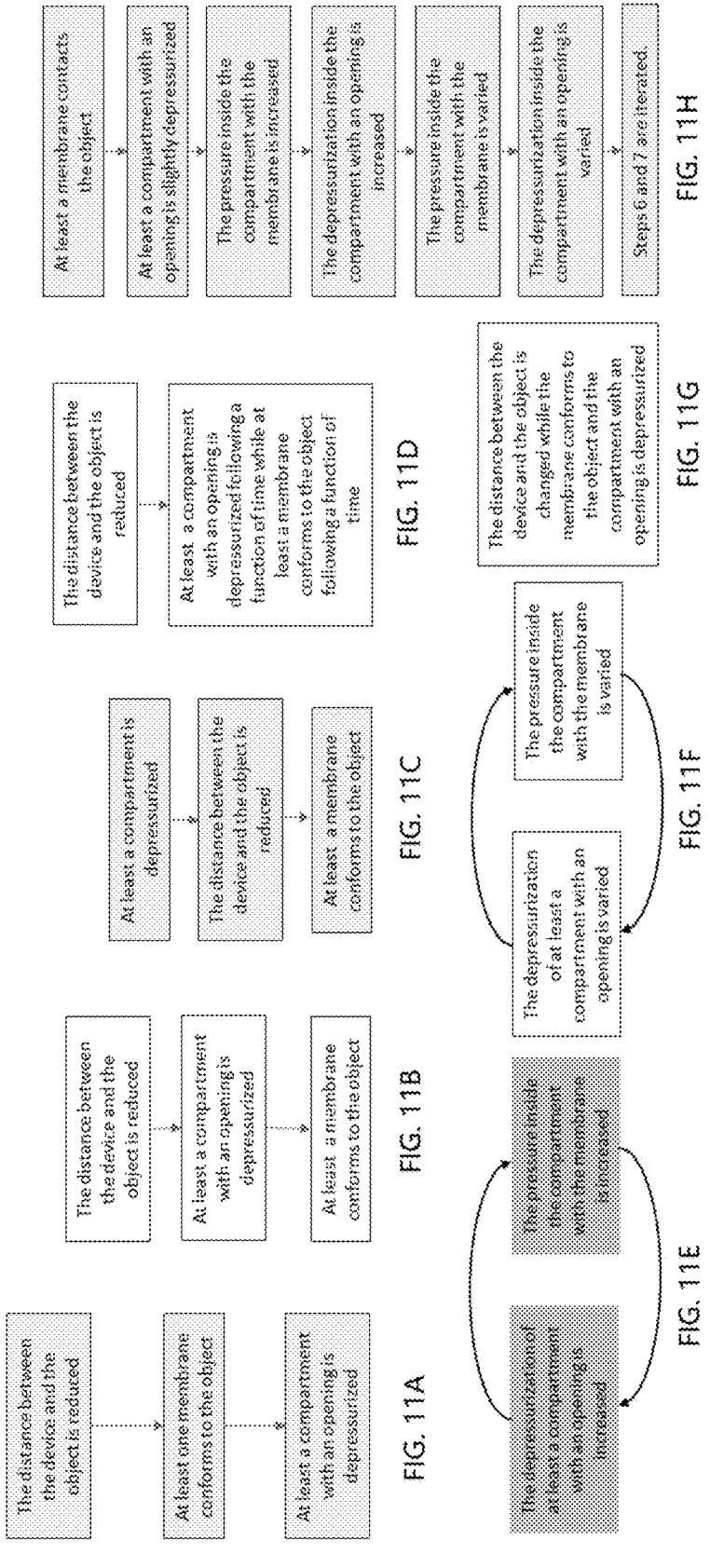

The distance between the device and the object is reduced → At least one membrane conforms to the object → At least a compartment with an opening is depressurized

FIG. 11A

The distance between the device and the object is reduced → At least a compartment with an opening is depressurized → At least a membrane conforms to the object

FIG. 11B

At least a compartment is depressurized → The distance between the device and the object is reduced → At least a membrane conforms to the object

FIG. 11C

The distance between the device and the object is reduced → At least a compartment with an opening is depressurized following a function of time while at least a membrane conforms to the object following a function of time

FIG. 11D

The depressurization of at least a compartment with an opening is increased ⇄ The pressure inside the compartment with the membrane is increased

FIG. 11E

The depressurization of at least a compartment with an opening is varied ⇄ The pressure inside the compartment with the membrane is varied

FIG. 11F

The distance between the device and the object is changed while the membrane conforms to the object and the compartment with an opening is depressurized

FIG. 11G

At least a membrane contacts the object → At least a compartment with an opening is slightly depressurized → The pressure inside the compartment with the membrane is increased → The depressurization inside the compartment with an opening is increased → The pressure inside the compartment with the membrane is varied → The depressurization inside the compartment with an opening is varied → Steps 6 and 7 are iterated.

FIG. 11H

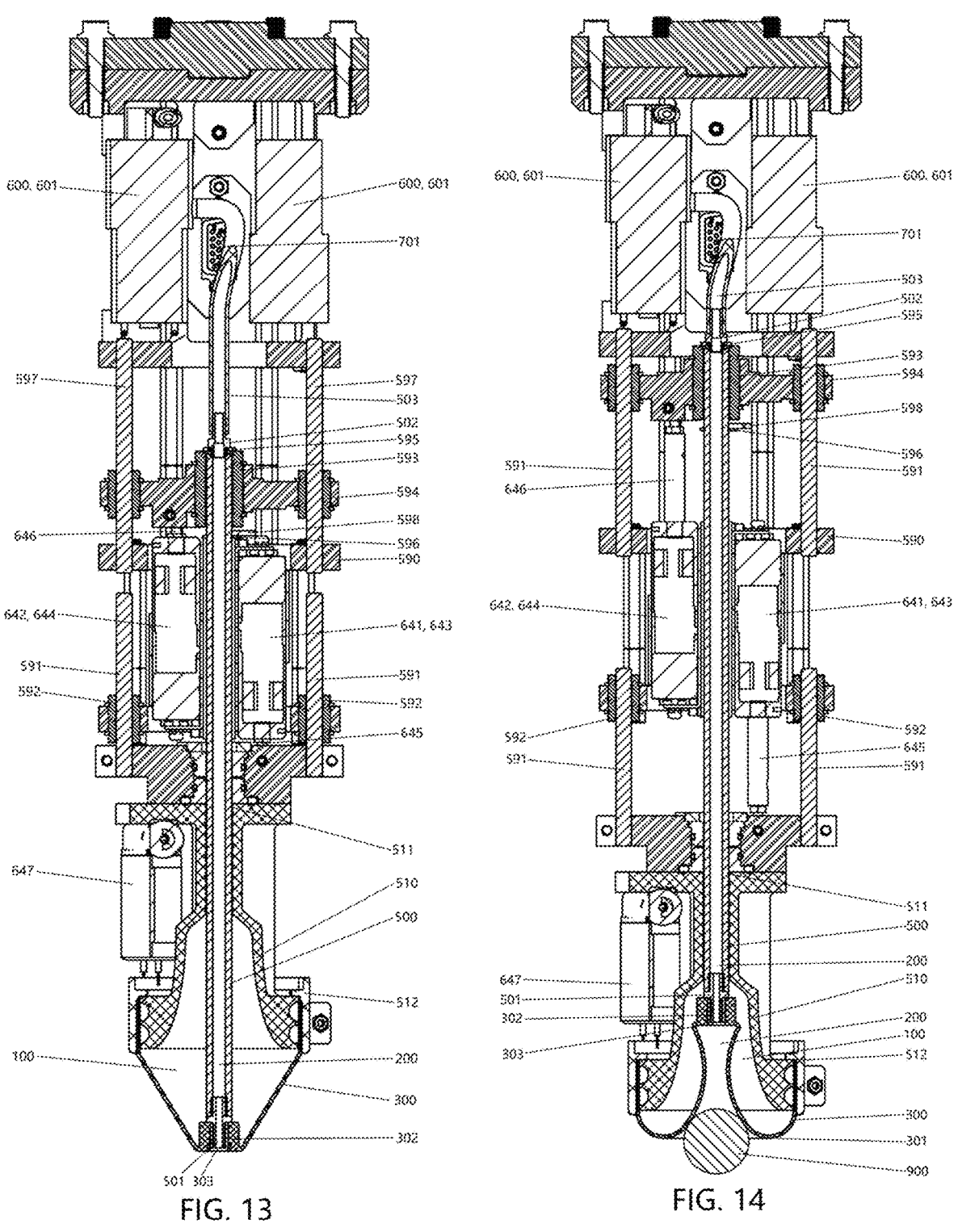
FIG. 13                    FIG. 14

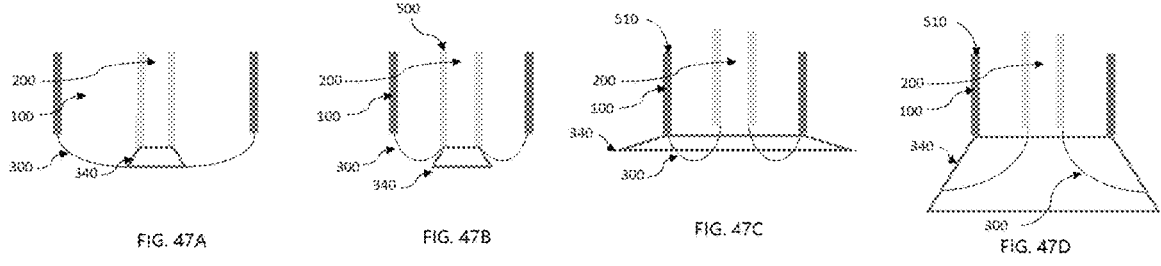
FIG. 47A          FIG. 47B          FIG. 47C          FIG. 47D
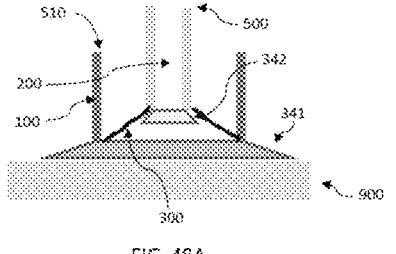 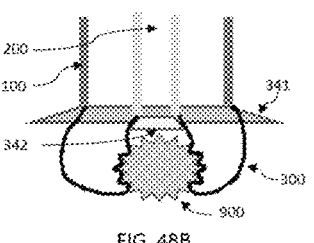 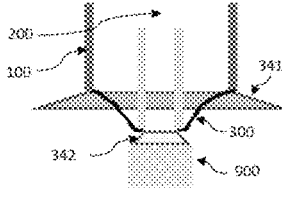
FIG. 48A          FIG. 48B          FIG. 48C

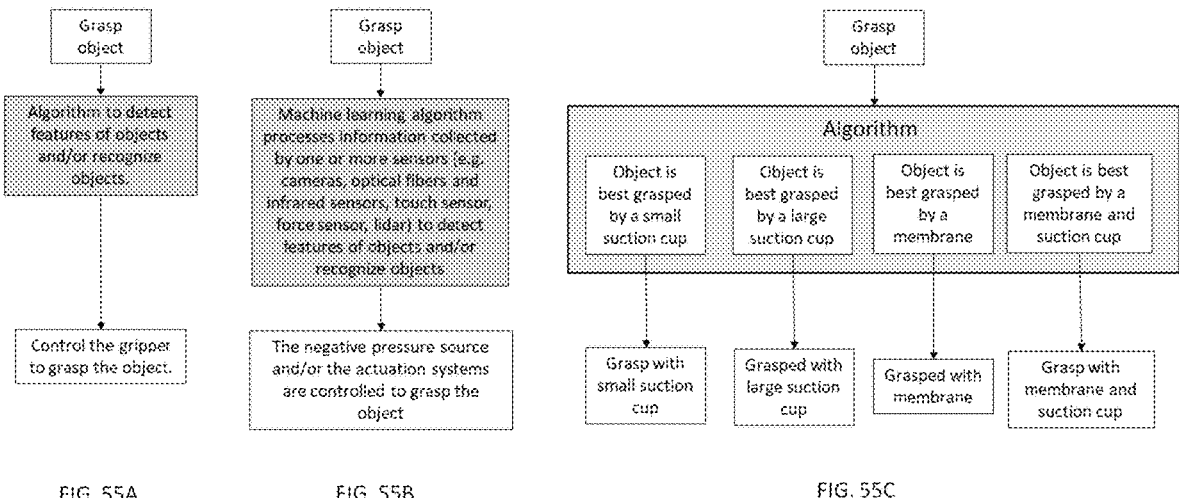

Grasp
object

Algorithm to detect
features of objects
and/or recognize
objects.

Control the gripper
to grasp the object.

FIG. 55A

Grasp
object

Machine learning algorithm
processes information collected
by one or more sensors (e.g.
cameras, optical fibers and
infrared sensors, touch sensor
force sensor, lidar) to detect
features of objects and/or
recognize objects The negative pressure source
and/or the actuation systems
are controlled to grasp the
object

FIG. 55B

Grasp
object

Algorithm

| Object is best grasped by a small suction cup | Object is best grasped by a large suction cup | Object is best grasped by a membrane | Object is best grasped by a membrane and suction cup |

Grasp with
small suction
cup

Grasped with
large suction
cup

Grasped with
membrane

Grasp with
membrane and
suction cup

FIG. 55C

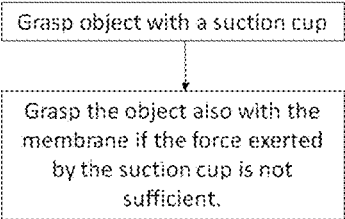

Grasp object with a suction cup

Grasp the object also with the
membrane if the force exerted
by the suction cup is not
sufficient.

FIG. 56

METHOD AND APPARATUS FOR AN ADAPTABLE SUCTION DEVICE

CROSS-REFERENCE TO RELATED APPLICATIONS

This application is a National Phase application that claims priority to and the benefit of the international PCT Patent Application No. PCT/US2020/060308 entitled "METHOD AND APPARATUS FOR AN ADAPTABLE SUCTION DEVICE", filed on Nov. 12, 2020, which claims the benefit of U.S. Provisional Patent Application No. 62/933,647, filed on Nov. 11, 2019, and U.S. Provisional Patent Application No. 63/038,806, filed on Jun. 13, 2020, the entirety of which are incorporated herein by reference.

STATEMENT REGARDING FEDERALLY SPONSORED RESEARCH AND DEVELOPMENT

Not Applicable.

FIELD OF THE INVENTION

This invention relates generally to a device configured to grasp, attract, and hold objects, and more particularly, to a method and apparatus for grasping a large variety of different objects.

DISCUSSION OF RELATED ART

The rise of automation across industries such as manufacturing, agriculture, e-commerce, and logistics brings about the ever-increasing need for robotic manipulators as well as grippers that will fit onto them. More specifically, the need to grip different kinds of objects with a single gripper arises in many fields. Existing solutions mainly involve the use of finger-type grippers or vacuum cups.

For finger type gripping devices, the gripping force, the direction of approach, and the gripping point on the object need to be well defined to ensure successful gripping while not damaging the object. Furthermore, finger type gripping devices have difficulties gripping objects from a surface of the object that is larger than the maximum opening of the fingers. Also, if a batch of cuboid-shaped boxes are tightly packed, so that all side faces of a box is in full contact with the adjacent boxes, finger type gripping devices cannot get hold of the box from the top because there is no space for the fingers to reach in and get hold of the side faces of the box.

Vacuum cups can grip objects larger than the cup size or pick one box from a batch of tightly packed boxes, and do not have as high demand on gripping force control. However, since vacuum cups have difficulties gripping objects with shapes such that a seal between the object and the vacuum cup cannot be well established, the types of objects they can grip are limited, and the direction of approach and the gripping point on the object still need to be well defined.

Combining fingers and vacuum cups into a single gripping device, such as that in U.S. Pat. No. 7,409,812, can mitigate some of their respective limitations, but the issues regarding the direction of approach and the gripping point remain. Additionally, they very often still fail to grasp a large variety of objects including large surfaces which are not flat.

While several grippers exist, such as finger-type grippers and vacuum cup grippers, none are particularly effective and adapted to work for various types of objects. As such, there is a continued need for a device that can utilize gripping and suction forces to pick up and move a wide variety of objects. Furthermore, there is a continued need for a device that provide continuous attractive forces while an object is being grasped and displaced. The present invention satisfies these needs.

SUMMARY OF THE INVENTION

The present invention will provide a suction device adapted to provide gripping and suction forces to pick up and move a wide variety of objects. This is accomplished through a suction compartment, a membrane compartment, deformable membrane sealing said membrane compartment, and at least one pressure mechanism. The at least one pressure mechanism is in fluid connection with the suction compartment and is configured to modify properties within the suction compartment to assist in providing gripping and attractive forces. The present invention will grasp an object by positioning the deformable membrane adjacent to said object, modifying the deformable membrane to conform to and create a seal with said object, and then depressurizing the suction compartment vis the pressure mechanism, providing a suction force onto said object within that sealed area sufficient to grasp said object.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DESCRIPTION OF THE DRAWINGS

FIG. 1A is a cross-section of the front perspective view of the present invention;

FIG. 1B is a cross-section of the front perspective view of the present invention;

FIG. 1C is a cross-section of the front perspective view of the present invention;

FIG. 2A is a cross-section of the bottom perspective view of the present invention;

FIG. 2B is a cross-section of the bottom perspective view of the present invention;

FIG. 2C is a cross-section of the bottom perspective view of the present invention;

FIG. 2D is a cross-section of the bottom perspective view of the present invention;

FIG. 2E is a cross-section of the bottom perspective view of the present invention;

FIG. 2F is a cross-section of the bottom perspective view of the present invention;

FIG. 3A is a cross-section of the front perspective view of the present invention;

FIG. 3B is a cross-section of the front perspective view of the present invention;

FIG. 3C is a cross-section of the front perspective view of the present invention;

FIG. 3D is a cross-section of the front perspective view of the present invention;

FIG. 3E is a cross-section of the front perspective view of the present invention;

FIG. 3F is a cross-section of the front perspective view of the present invention;

FIG. 11A is a series of block diagrams of the present invention;

FIG. 11B is a series of block diagrams of the present invention;

FIG. 11C is a series of block diagrams of the present invention;

FIG. 11D is a series of block diagrams of the present invention;

FIG. 11E is a series of block diagrams of the present invention;

FIG. 11F is a series of block diagrams of the present invention;

FIG. 11G is a series of block diagrams of the present invention;

FIG. 11H is a series of block diagrams of the present invention;

FIG. 13 is a cross-section of the front perspective view of a detailed embodiment of the present invention;

FIG. 14 is a cross-section of the front perspective view of a detailed embodiment of the present invention;

FIG. 47A is a cross-section of the front perspective view of the present invention;

FIG. 47B is a cross-section of the front perspective view of the present invention;

FIG. 47C is a cross-section of the front perspective view of the present invention;

FIG. 47D is a cross-section of the front perspective view of the present invention;

FIG. 48A is a cross-section of the front perspective view of the present invention;

FIG. 48B is a cross-section of the front perspective view of the present invention;

FIG. 48C is a cross-section of the front perspective view of the present invention;

FIG. 55A is a series of block diagrams of the present invention;

FIG. 55B is a series of block diagrams of the present invention;

FIG. 55C is a series of block diagrams of the present invention; and

FIG. 56 is a series of block diagrams of the present invention.

DETAILED DESCRIPTION OF THE PREFERRED EMBODIMENT

Figures 4A, 4B, 4C, 5, 6A, 6B, 6C, 6D, 6E, 7, 8A, 8B, 8C, 9A, 9B, 9C, 10:
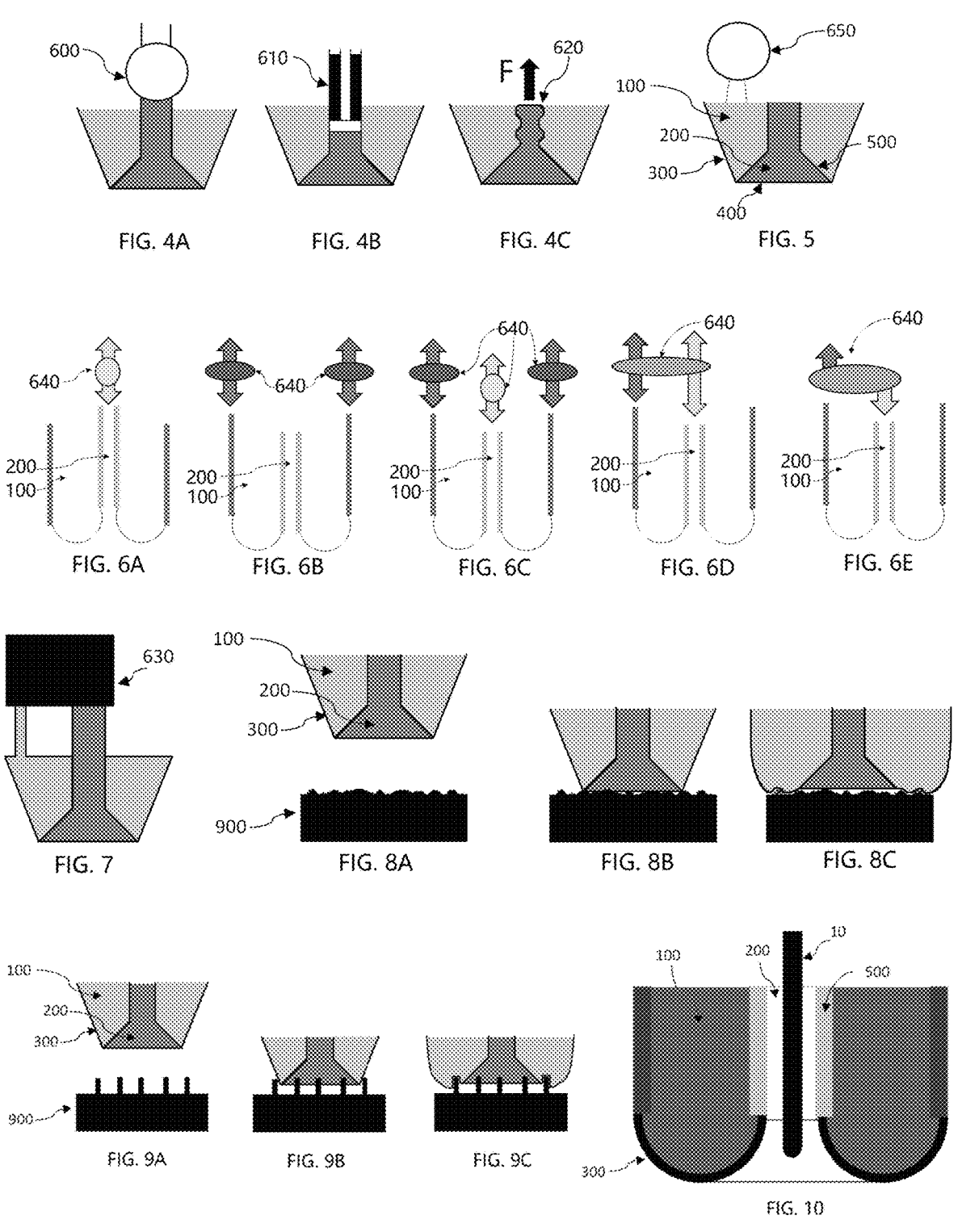
FIG. 4A is a cross-section of the front perspective view of the present invention.
FIG. 4B is a cross-section of the front perspective view of the present invention.
FIG. 4C is a cross-section of the front perspective view of the present invention.
FIG. 5 is a cross-section of the front perspective view of the present invention.
FIG. 6A is a cross-section of the front perspective view of the present invention.
FIG. 6B is a cross-section of the front perspective view of the present invention.
FIG. 6C is a cross-section of the front perspective view of the present invention.
FIG. 6D is a cross-section of the front perspective view of the present invention.
FIG. 6E is a cross-section of the front perspective view of the present invention.
FIG. 7 is a cross-section of the front perspective view of the present invention.
FIG. 8A is a cross-section of the front perspective view of the present invention.
FIG. 8B is a cross-section of the front perspective view of the present invention.
FIG. 8C is a cross-section of the front perspective view of the present invention.
FIG. 9A is a cross-section of the front perspective view of the present invention.
FIG. 9B is a cross-section of the front perspective view of the present invention.
FIG. 9C is a cross-section of the front perspective view of the present invention.
FIG. 10 is a cross-section of the front perspective view of the present invention.

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

The present invention comprises a suction compartment 200, a membrane compartment 100, a suction wall 500, a membrane wall 510, a deformable membrane 300 attached to the suction and membrane walls 500, 510, and at least one pressure mechanism 600. The suction compartment 200 is formed within the suction wall 500 and a membrane compartment 100 is formed between the suction wall 500, membrane wall 510, and deformable membrane 300. The at least one pressure mechanism 600 is in fluid connection with the suction compartment 200 and is configured to modify properties within the suction compartment 200. When the properties of the suction compartment 200 and/or membrane compartment 100 are modified, the size, shape, and orientation of the deformable membrane 300 are also modified. As such, the present invention will grasp an object 900 by positioning the deformable membrane 300 adjacent to said object 900, modifying the deformable membrane 300 to conform to and create a seal with said object 900, and then depressurizing the suction compartment 200 by the pressure mechanism 600, providing a suction force onto said object 900 within that sealed area sufficient to grasp said object 900.

The suction compartment 200 can generally be described as a tube or otherwise elongated, cylindrical chamber delineated by a suction wall 500. In the preferred embodiment, the suction wall 500 is rigid and is positioned within the membrane compartment 100. In alternative embodiments, the suction compartment 200 may be positioned outside of the membrane compartment 100 and may be flexible, or may have flexible portions. Furthermore, in alternative embodiments, the suction wall 500 and suction compartment 200 are configured to move relative to the membrane wall 510. These varying embodiments will be further described below. Furthermore, the suction wall 500 may further comprises different shapes, different thicknesses, and can be made from a variety of different materials.

The suction compartment 200 is in fluid communication with a pressure mechanism 600 and further comprises an opening 400 generally in communication with the environment via an opening 400. For example, if the present invention is operated in air in a room, the pressure in the suction compartment 200 before the device contacts the object 900 would be the atmospheric pressure. The opening 400 of the suction compartment 200 can take the form of at least one or a combination of some or all of the following configurations: single hole, surface with multiple holes, grid, porous material, filter, breathable material, or other ways to create a communication between the suction compartment 200 and the environment.

The membrane compartment 100 is delineated by the suction wall 500, membrane wall 510, and is partially or completely enclosed by at least one deformable membrane 300 or a portion of a membrane. In the preferred embodiment, the membrane wall 510 is rigid and oriented parallel to the suction wall 500. In alternative embodiments, the membrane wall 510 is orientated such that the effective surface area of the deformable membrane 300 is increased or decreased. More specifically, the outer diameter of the deformable membrane 300, and the seal created by the deformable membrane 300, are increased, effectively increasing the volume inside the suction compartment and seal. Alternatively, the membrane wall 510 may be angled. In further alternative embodiments, the membrane wall 510 is configured to move relative to the suction wall 500 such that the shape and effective surface area of the deformable membrane 300 are modified. These varying embodiments will be further described below. Furthermore, the membrane wall 510 may further comprises different shapes, different thicknesses, and can be made from a variety of different materials.

The deformable membrane 300, which encloses the membrane compartment 100, is configured to conform to changes made within the membrane compartment 100. More specifically, the membrane compartment 100 is filled in with a medium, where changes in properties of said medium will modify the shape, size, orientation, and effective surface area of the deformable membrane 200. This medium can be one or a combination of the following elements: a gas, a fluid, a granular material, a phase-changing material, compressible solids, or other material that enables such a compartment to change shape.

The deformable membrane 300 is made of one or a plurality of materials, comprising; polymers, elastomers, composite materials, and materials doped with nanoparticles, platelets, graphite, graphane, graphene, nanotubes, silicone, latex, thermoplastic elastomer, fiber reinforced materials, metals, or other materials. In several embodiments, the deformable membrane 300 may be stretchable or not stretchable and may have a monolithic structure comprising a single component. Furthermore, the deformable membrane 300 may also have an assembled structure, comprising at least one component that can change shape in addition to one or more components that cannot change shape (e.g. metallic threaded inserts). Furthermore, cavities and/or conduits may be present inside the deformable membrane 300 to serve different functions (e.g. structural, fluid passages, thermal insulation). Lastly, the deformable membrane 300 may be formed with a variety of surface textures, such as smooth, rough, with one or more dents, or with one or more protrusions 350.

In an alternative embodiment, the deformable membrane 300 further comprises a bellow shape, suction cup shape, protrusions, dents, ridges, grooves, texture, holes, cavities, different thickness, or formed from different materials or further comprises a combination of membranes.

The pressure mechanism 600 is configured to change the properties within the suction compartment 200. In the preferred embodiment, the pressure mechanism 600 is in fluid communication with the suction compartment 200 only. In an alternative embodiment, pressure mechanism 600 can be configured to change the properties within both the suction compartment 200 and the membrane compartment 100. In a further alternative embodiment, the pressure mechanism 600 is in fluid communication with the membrane compartment 100 relative to the suction compartment 200 such that any changes in the suction compartment 200 directly affect the membrane compartment 100. For example, if the pressure mechanism 600 depressurizes the suction compartment 200, it would then pressurize the membrane compartment 100.

FIG. 1A is an exemplary embodiment of the present invention, illustrating the suction compartment 200, membrane compartment 100, deformable membrane 300, suction wall 500, membrane wall 510, and the opening 400 to the environment. FIG. 1A also illustrates the pressure mechanism 600 for changing the pressure inside the suction compartment 200, as well as a membrane pressure mechanism 650 for changing the pressure inside the membrane compartment 100, resulting in a change of shape of the deformable membrane 300. FIG. 1B illustrates the suction wall 500 having a curved shape. FIG. 1C illustrates the opening 400 having a flared or funnel-shape, increasing the surface area of the seal created by the deformable membrane 300 when positioned adjacent to said object 900.

FIGS. 2A-2F illustrate various embodiments, shown from a bottom view, where the suction and membrane compartments 200, 100 are orientated in various configurations with different shapes. FIG. 2A illustrates the preferred embodiment described above, while FIG. 2B illustrates an alternative embodiment where the suction compartment 200 is swapped with the membrane compartment 100. FIG. 2C illustrates an alternative embodiment where the membrane compartment 100 is positioned adjacent to the suction compartment 200. FIG. 2D illustrates an alternative embodiment comprising a plurality of membrane compartments 101, 102, 103 surrounding the suction compartment 200. In this embodiment, membrane compartment 101, 102, 103 may comprise its own membrane 300 or a single membrane 300 where the compartments share a portion. FIG. 2E illustrates an alternative embodiment comprising a plurality of suction compartments 201, 202, 203 within a membrane compartment 100. FIG. 2F illustrates an alternative embodiment comprising a ring 199 connecting the suction compartment 200 and the membrane compartment 100.

FIGS. 3A-3F illustrate various embodiments, shown from a front and/or front cross-sectional view, where the suction compartment 200, membrane compartment 100, and deformable membrane 300 are orientated in various configurations with different shapes. FIGS. 3A and 3C illustrate the suction compartment 200 positioned within the membrane compartment 100, while FIG. 3B illustrates the suction compartment 200 positioned on one side of the membrane compartment 100. FIGS. 3D and 3E illustrate the suction compartment 200 as a thin conduit to create suction. FIG. 3F illustrates the deformable membrane 300 having a variable thickness.

FIG. 4A illustrates a single pressure mechanism 600 is positioned above the suction compartment 200. FIG. 4B illustrates a single negative pressure source in the form of a piston 610 positioned within the suction compartment 200 for increasing or decreasing the pressure within the suction compartment 200. FIG. 4C illustrates a suction compartment 200 having a flat suction wall 500 that caps the center opening 400 of the deformable membrane 300, and the pressure mechanism 600 in the form of a force 620 is applied to the inner wall 500, pulling it such that the volume of the suction compartment 200 is increased and its pressure decreased provided its opening is sealed from the environment.

FIGS. 5 and 6A-6E are exemplary embodiments illustrating how the shape and position of the deformable membrane

300 can be manipulated through changes in the membrane compartment 100, changes in the suction compartment 200, or through the movement of structural elements that form the compartments 100, 200. More specifically, one or a plurality of the following items may be used to manipulate the shape and position of the deformable membrane 300: a pump, a compressor, a Venturi® system, a valve, a material that can absorb a fluid physically or chemically, an evacuated volume of space, a volume of space containing pressurized fluid, a piston 610, one or more actuation mechanism 640 that work based on mechanical, electro-mechanical, pneumatics, hydraulics, electric, magnetic, piezoelectric, shape-memory, electromagnetic, electrostatic, thermal, sonic, chemical, or other principle of actuation that displaces and/or deforms the membrane 300 and/or the structural element that form part of the present invention, a system displacing the substance inside the membrane compartment 100, or a force 620 applied to the suction wall 500 in the form of a flat element sealing an opening of compartment 200.

In FIG. 5, movement in the deformable membrane 300 is induced by pressurizing or depressurizing the substance inside the membrane compartment 100 through the membrane pressure mechanism 650.

FIG. 6A illustrates a change in shape of the deformable membrane 300 by moving the suction wall 500 through an actuation mechanism 640, FIG. 6B shows change by moving the membrane wall 510 through a plurality of actuation mechanisms 640, and FIG. 6C shows change by moving both walls 500, 510 through a plurality of actuation mechanisms 640. FIG. 6D shows an embodiment where a single actuation mechanism 640 can move the walls 500, 510 independently, while FIG. 6E shows that the suction wall 500 moves in relation to and opposite of the membrane wall 510.

FIG. 7 illustrates an embodiment where an actuation system 630 operates similarly to the pressure mechanism 600, but is connected to both compartments 100, 200. The actuation system 630, which may consist of a compressor, a Venturi® system, a vacuum generator or a combination of these, is in fluid communication with the membrane compartment 100 relative to the suction compartment 200. Here, the actuation system 630 will draw air from the suction compartment 200, compresses the air, deliver it to the membrane compartment 100. Conversely, the actuation system 630 could also move air from the membrane compartment 100 to the suction compartment 200. In an alternative embodiment, valves can be used either in either or both compartments 100, 200 to regulate their pressure.

FIGS. 8A-8C illustrate the suction effect when the present invention approaches an object 900 that does not have a smooth surface. In FIG. 8B, where the suction compartment 200 is depressurized, the effectiveness of the seal may be limited due to the non-uniform surface of the object 900, and as a consequence, the gripping and suction forces are also reduced. FIG. 8C illustrates the benefit of modifying the shape of the deformable membrane 300. Here, the seal is strengthened through the conformation of the deformable membrane 300 to the object 900, thus improving the suction effect and reducing a potential leak. The present invention would be particularly suitable for objects where suction cups may fail to make the desirable seal. Examples include shrink-wrapped objects, objects with rough surfaces, objects with corners, and other objects with non-flat or irregular surfaces.

FIGS. 9A-9C illustrate how, in addition to suction, the present invention can improve grasping through friction forces. More specifically, by conforming to the shape of an object 900 with vertical spikes, the deformable membrane 300 will create additional friction forces, especially when the grasping action generates a component of the force in shear. FIG. 9B illustrates how suction forces may be inadequate for these types of objects 900, where a seal cannot easily be made. FIG. 9C illustrates the deformable membrane 300 in direct contact with the vertical spikes and adapting to their shape. This would allow the deformable membrane 300 to grasp the object 900 via friction forces. Such friction forces would be combined with suction forces in case a seal is formed. If suction is not effective (e.g. poor seal), friction would be a primary holding force.

FIG. 10 illustrates an embodiment where the deformable membrane 300 is attached at the edge of the suction wall 500 to the edge of the wall 510. Here, a sensor 10 is used to determine various properties of the device and the object 900. In the preferred embodiment, the sensor 10 is configured to monitor the pressure exerted by the deformable membrane 300 against the object 900. Here, the sensor 10 further comprises measuring the absolute or differential pressure inside of the suction compartment 200 and may further comprise strain and pressure sensors measuring the tension of the deformable membrane 300. Other sensors 10 can also be used to control the variation in pressure of the membrane compartment 100, including pressure sensors. Furthermore, the same or a plurality of sensors 10 can be used to control the pressure exerted by the membrane 300 and the pressure in the suction compartment 200.

Other types of sensors 10 can also be used to monitor, either directly or indirectly, the movement of the membrane 300, the interaction between the membrane 300 and the object 900, the strength of the gripping force, and the existence of the object 900. These sensors include distance sensors, cameras, optical fibers, touch sensors, and infrared sensors, and this information can be used to actively or automatically control the compartment pressure variation actions and the membrane 300. The same or different kind of sensors 10 can be used to identify features of the object that could facilitate grasping. Such features would include its shape, material, porosity, corners, flatness, concavity, convexity, wrapped in a bag, etc. The sensors 10 could also recognize specific objects and use predefined parameters to grasp them.

FIGS. 11A-11H illustrate a method comprising manipulating at least one membrane 300 of a membrane compartment 100 to conform to an object 900, and creating a variation in pressure between the object 900 and a suction compartment 200. It should be noted that the conforming action of the membrane 300 could be performed before, after, or at the same time of the pressure varying action. The conforming and pressure varying actions can be a function of time, including a step function, a ramp, an exponential function or can take the shape of other waveforms. Such functions can be continuous, discontinuous, or discrete. The distance between the compartments 100, 200 and the object 900 can be increased or decreased by moving the suction compartment 200, the membrane compartment 100, and/or as a result of the variation of pressure of the membrane compartment 100, resulting in a change in shape of the membrane 300.

In an alternative embodiment, the relative motion of the compartments 100, 200 is obtained by at least one actuation mechanism 640. Such an actuation mechanism 640 can be implemented using mechanical, electro-mechanical, pneumatics, hydraulics, electric, magnetic, piezoelectric, shape-memory, electromagnetic, electrostatic, thermal, sonic, chemical, or other principles of actuation. The actuation mechanism 640 can move the membrane compartment 100, the suction compartment 200, or both.

In another embodiment the properties of membrane 300 are actively changed. Such changes can be obtained in a variety of ways which include, but are not limited to: changing one or more properties, e.g. pressure, temperature, pH value, flow rate, viscosity, density, and composition, of a fluid embedded in or passed through conduits in the membrane, changing the phase of the material of the membrane or the material embedded in the membrane, changing the temperature of the membrane or a material embedded in the membrane, changing the magnetic properties of the material of the membrane or material embedded in the membrane, changing the electrostatic properties of the material of the membrane or material embedded in the membrane, changing the electromagnetic properties of the material of the membrane or material embedded in the membrane.

In another embodiment, the device comprises at least one actuation system is used to perform at least one of the following actions: change the pressure of at least one compartment having at least one opening, change the pressure of at least one compartment having at least a membrane or a portion of a membrane, change the shape of at least one membrane or a portion of a membrane, change the relative position of at least two compartments, change the orientation of at least one compartment relative to the structural elements of the adaptable suction device, change the position of at least one compartment, change the properties of the membrane, change the properties of the material, or a portion of the material, inside at least a compartment, attract the object using electrostatic forces, attract the object using Van der Waals forces, attract the object using magnetic forces, attract the object using electromagnetic forces, and attract the object using nuclear forces.

Figures 15, 16, 17:
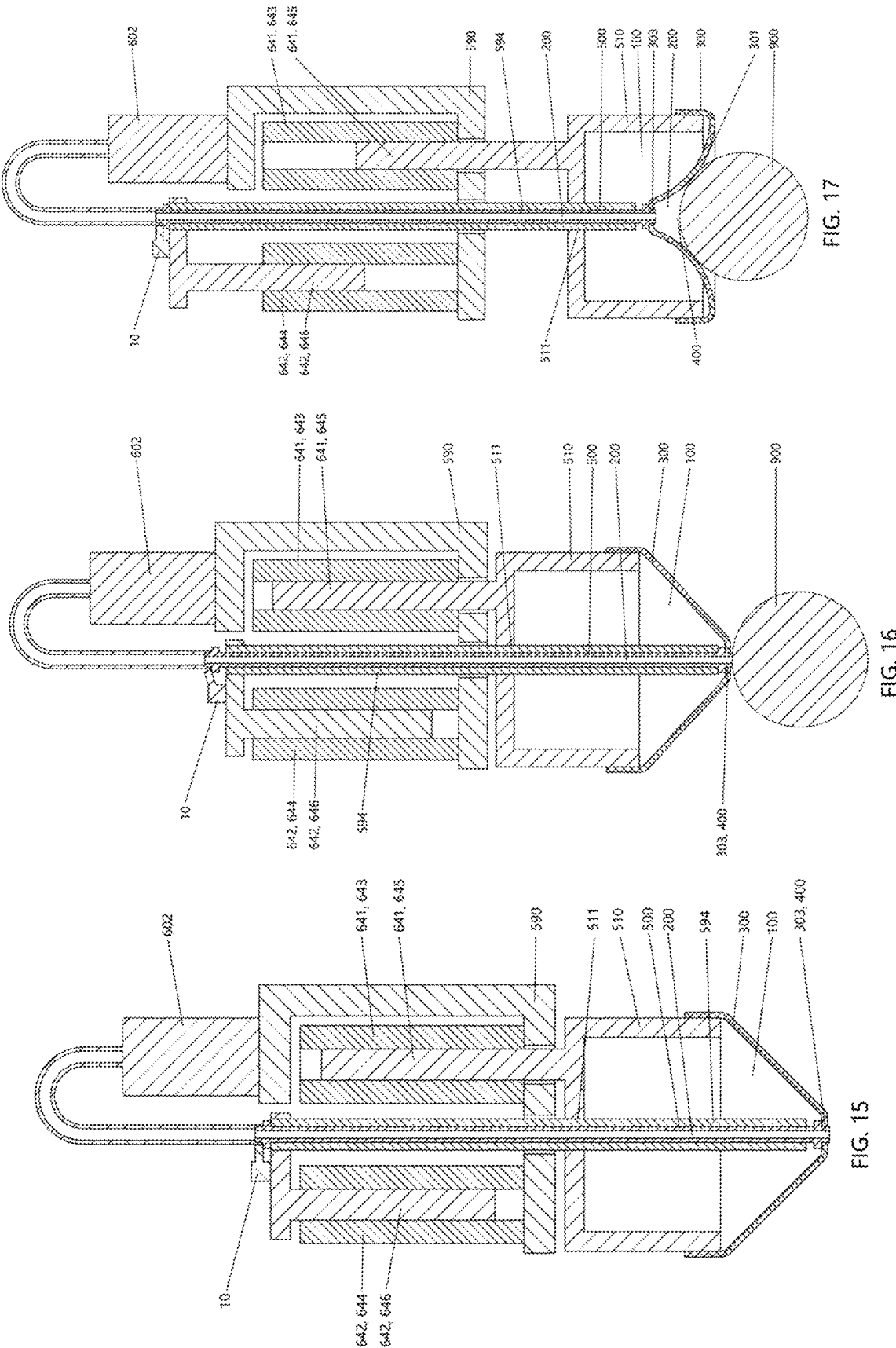
FIG. 15 is a cross-section of the front perspective view of the present invention.
FIG. 16 is a cross-section of the front perspective view of the present invention.
FIG. 17 is a cross-section of the front perspective view of the present invention.

A practical implementation of an embodiment of the present invention is shown in FIGS. 12A-14, as well as FIGS. 15-17 with unessential details removed for clearer presentation.

The embodiment shown in FIGS. 15-17 comprises a pressure mechanism 602 which can be a pump, a Venturi® system, a material that can absorb a fluid physically or chemically, an evacuated volume of space, a piston 610, or other principle of negative pressure generation, a membrane compartment 100 that is enclosed by a membrane 300, a membrane wall 510, an suction wall 500, an suction compartment 200 that is delimited from the membrane compartment 100 by the suction wall 500, and two actuation mechanisms 641 and 642, each comprising a static component 643 and 644 and a movable component 645 and 646. The static components 643 and 644 of the two actuation mechanisms and the pressure mechanism 602 are fixed to the framing structure 590. The wall 510 of the membrane compartment 100 is attached to the movable component 645 of the actuation mechanism 641.

The suction wall 500 that delimits the suction compartment 200 takes the form of a tube that can slide linearly within a small range relative to the movable component 644 of the other actuation mechanism 642. The other end of the suction wall 500 goes through a hole 511 (a rod seal is applied to the hole to prevent leakage between the membrane compartment 100 and the environment) in the wall 510 and attached to the membrane 300. Therefore, the relative position between the membrane compartment 100 and the suction compartment 200 that is delimited by the suction wall 500 can be actively controlled by the two actuation mechanisms 641 and 642, and hence affecting the shape of the membrane 300, the shape of the membrane compartment 100, the shape of the suction compartment 200, and can also affect the pressure in the membrane compartment 100. The suction wall 500 that delimits the suction compartment 200 connects the pressure mechanism 602 to the opening 400 of the suction compartment 200. The membrane compartment 100 is sealed from the environment and filled with air. A sensor 10 is fixed to the movable component 646 of the actuation mechanism 642 to detect the interaction between the membrane 300 and the object indirectly via detecting the small relative sliding motion between the suction wall 500 and the movable component 646 of the actuation mechanism 642.

FIG. 15 illustrates a resting state, where the suction wall 500 is in a position relative to the movable component 646 of the actuation mechanism 642 such that the sensor 10 is not triggered. In FIG. 16 illustrates an object-detected state, where the membrane 300 and the object 900 are brought into contact with each other and the suction wall 500 is pushed up by the object 900 relative to the movable component 646 of the actuation mechanism 642, triggering the sensor 10. At this moment, the output signal from the sensor 10 can be used to activate a gripping state, as shown in FIG. 17. Alternatively, the present invention can also be activated into the gripping state via an external command when the membrane 300 is in contact with or not in contact with but in close proximity to the object 900.

Once in a gripping state, the present invention uses the following method to grip the object 900. First, the pressure mechanism 602 is turned on such that a low pressure is formed in the suction compartment 200, applying a small attracting force to the object 900. Then, the membrane wall 510 is moved by the actuation mechanism 641 towards the object 900, bringing the region of the membrane 300 close to the edge of the suction wall 500 with it towards the object 900. Furthermore, the volume of the suction compartment 200 is reduced, causing the pressure of the membrane compartment 100 to increase and, consequently, cause the membrane 300 to bulge out 301. The reduced distance between the membrane 300 and the object 900, along with the bulging out of the membrane 301, cause the membrane 300 to first contact with then conform to the surface of the object 900, sealing the opening 400 of the suction compartment 200, inducing pressure, friction, and optionally mechanical interlocking effect between the membrane 300 and the object 900 that can help gripping the object 900. Optionally, other attractive effects such as Van der Waals force, electrostatic adhesion, and magnetic adhesion could come into effect or be turned on at this moment to further allowing the object 900 to stick to the membrane 300.

While the pressure mechanism 602 remains active and the opening 400 of the suction compartment 200 is sealed off from the environment due to the membrane 300 contacting the object 900, the pressure in the suction compartment 200 drops further, inducing a strong suction. There could be leakage between the suction compartment 200 and the environment because the contacting area of the membrane 300 and the object 900 may not seal off compartment 200 perfectly. Even so, as long as the leakage is below a certain threshold, the ongoing operation of the pressure mechanism 602 can still maintain a sufficiently strong negative pressure in the suction compartment 200, resulting in suction for gripping. This is one major advantage of the present invention compared to existing flexible grippers, which cannot maintain suction due to the lack of a pressure mechanism 602.

Subsequently, or during the time when the membrane wall 510 is still moving, the suction wall 500 is drawn away from the object 900 by the actuation mechanism 642, bringing the part of membrane 300 near the suction wall 500 further away from the object 900. This increases the volume of the suction compartment 200 and further reduces its pressure, thus further increasing suction. In addition, the volume of the membrane compartment 100 is further decreased, increasing the pressure in the membrane compartment 100, causing the membrane 300 to bulge out more, thus further increasing friction and optionally mechanical interlocking effects between the membrane 300 and the object 900, creating stronger grasping force. At this moment, the object 900 is firmly gripped and can be lifted and moved as desired.

To release the object 900, the pressure mechanism 602 is deactivated such that the suction in the suction compartment 200 is not actively maintained. Optionally, other attractive effects such as electrostatic adhesion and/or magnetic adhesion are turned off. The suction wall 500 and membrane wall 510 are returned to their original position by their respective actuation mechanisms, bringing the membrane 300 to its original shape and detaching it from the object 900.

FIGS. 15-17 illustrate a more detailed implementation of the embodiment shown in FIGS. 12A-14. This implementation comprises one pressure mechanism 602 in the form of a pressure mechanism 600, two actuation mechanism 641 and 642, one membrane compartment 100 delimited by a membrane 300, a membrane wall 510, a suction wall 500, a suction compartment 200 that is delimited from the membrane compartment 100 by the suction wall 500, and the membrane 300. The pressure mechanism 600 comprises two pumping stages 601 connected pneumatically in series. The negative pressure generated by the pressure mechanism 600 can be continuous adjustable by adjusting the voltage applied to the pumping stages 601.

The actuation mechanism 641 and 642 are in the form of two electromechanical linear actuators. The membrane wall 510 is connected to actuation mechanism 641. The suction wall 500 takes the form of a hollow shaft. The membrane 300 comprises of multiple layers of silicone rubbers of different hardness to achieve a good balance between flexibility and durability. A threaded insert 302 is fixed to the center of the membrane 300 to allow the membrane 300 to be screwed onto the threaded end 501 of the suction wall 500 or the hollow shaft. A hole 303 coaxial to the threaded insert 302 is made through the membrane 300 to serve as the opening 400 for the suction compartment 200 for propagating the negative pressure generated by the pressure mechanism 600. The membrane wall 510, the suction wall 500, and the membrane 300 delimit the membrane compartment 100. The suction wall 500 delimits the suction compartment 200. Additional flow control devices such as valves and pumps can be connected to the suction compartment 200 to allow additional degrees of freedom in controlling the propagation of the negative pressure in the membrane compartment 200. A sensor 10 in the form of a load cell 11 is used.

All components are attached to a framing structure 590 as follows: the center of the membrane 300 is screwed onto a threaded end 501 of the suction wall 500 or the hollow shaft, such that air can flow from the environment through the hole 303 on the membrane 300 into the membrane compartment 100. The other end of the suction wall 500 is connected to the inflow port of the pressure mechanism 600 via a barb connector 502 and a flexible tube 503, so that the hole on the membrane 300, the suction wall 500 in the form of a hollow shaft, the barb connector 502, and the flexible tube 503 constitute the suction compartment 200. The edge region of the membrane 300 is fixed to the rim of the suction wall 500 via a clip 512. The suction wall 500 or the hollow shaft goes through a hole 511 at the top of the membrane wall 510. A rod seal is used at this hole 511 to seal the seam between the membrane wall 510 and the suction wall 500, thus sealing the compartment 100. It is noted that a contrivance in the form of a solenoid valve 647 is used to allow air exchange between the membrane compartment 100 and the environment, replenishing the membrane compartment 100 with air upon air losses from possible leakage. Alternatively, the said contrivance may comprise a valve and/or pump. Two guide shafts 591 are fixed to the top of the wall 510 and can slide in two linear bearings 592 fixed to the framing structure 590.

The end of the movable component 645 of the actuation mechanism 641 is attached to the top of the membrane wall 510. Therefore, the membrane wall 510 can move linearly relative to the framing structure 590 in a controllable manner. The top end of the suction wall 500 or the hollow shaft fits into a linear bearing 593 that is fixed on a beam 594. Therefore, the suction wall 500 can slide linearly relative to the beam 594. But the stroke of this sliding motion is limited by a washer 595 fit between the barb connector 502 and the end of the suction wall 500 and a retaining ring 596 that is fixed on the member. The beam 594 itself can slide linearly relative to the framing structure 590 along two linear shafts 597. The end of the movable component 646 of the actuation mechanism 642 is attached to the beam 594 so the motion of the beam 594 is also controlled. A sensor 10 in the form of a load cell 11 is secured to the beam 594 on one end, and a compliant plate 36 is fixed to its other end. The tip of the compliant plate 598 rests on the top surface of the retaining ring 596 on the suction wall 500.

At a resting state, the load cell 11 and the compliant plate 598 will keep the suction wall 500 at the lower end of its stroke. The load cell 11 signal outputs are processed by electronics 700 built into the gripper and converted into a signal indicating if an object is detected. This signal along with the control signals and power supplies to the actuation mechanism 641 and 642, the electronics 700, the pressure mechanism 600, and the load cell 11 constitute the electrical inputs and outputs of the present invention to the outside world and they are all presented on an electrical connector 701.

Figures 12A, 12B:
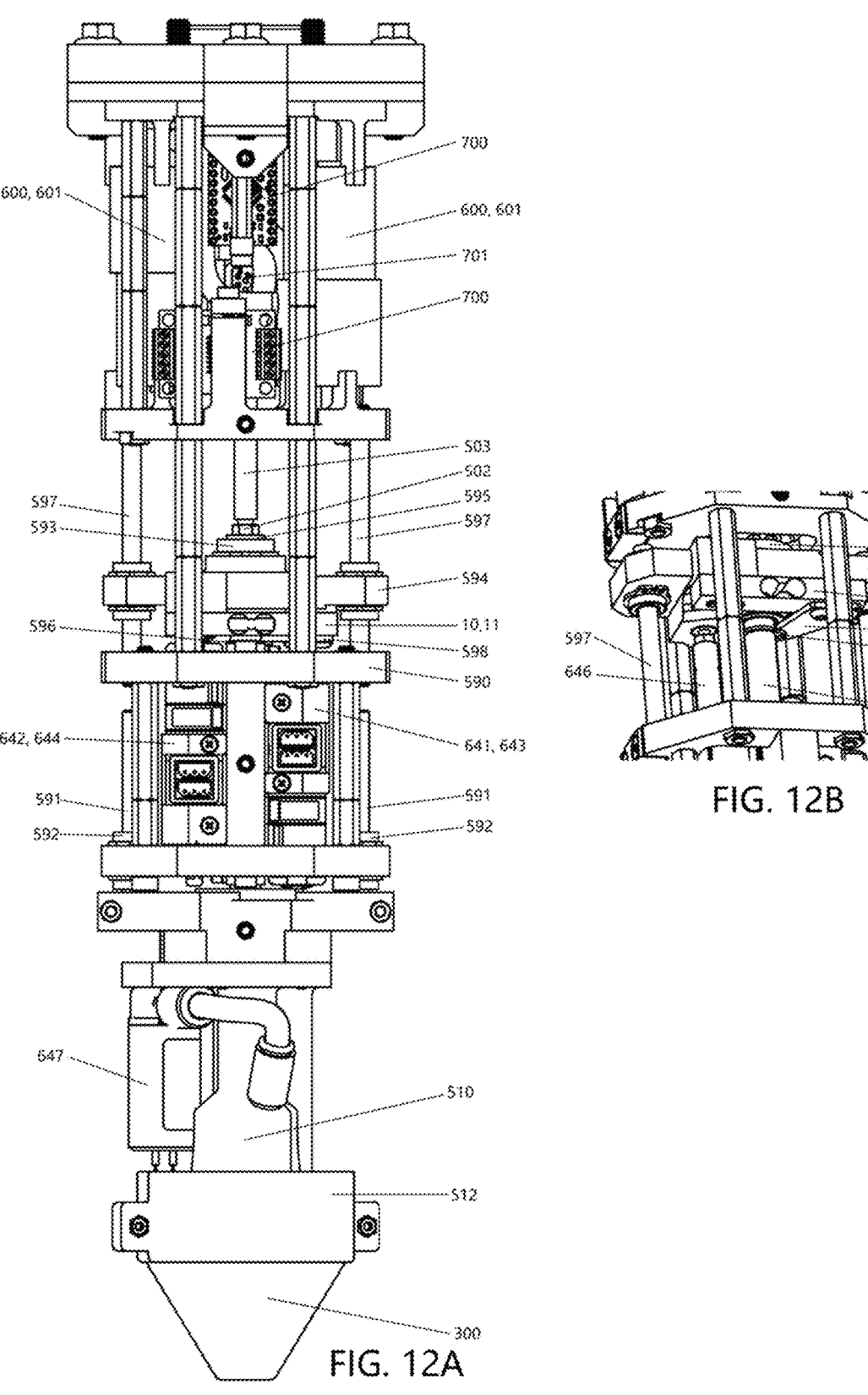
FIG. 12A shows a detailed embodiment of the present invention.
FIG. 12B shows a portion of a detailed embodiment of the present invention.

The gripping process shown in FIGS. 12A-14 are generally the same as that shown and discussed regarding FIGS. 15-17, although some differences exist. At the resting state as shown in FIGS. 12A and 13, both actuation mechanism 641 and 642 are retracted, the pressure mechanism 600 is deactivated, and the solenoid valve 647 is closed. The membrane wall 510 is at the top end of the stroke and the beam 594 is at the lower end of the stroke. At the beginning of a gripping cycle, upon touching the object 900, the object 900 pushes the membrane 500 and the suction wall 500 up along with the retaining ring 596. Since the beam 594 is fixed to the tip of the movable component 646 of the actuation mechanism 642, the beam 594 cannot move with the suction wall 500. Therefore, the retaining ring 596 presses against the compliant plate 598, which in turn presses against the load cell 11, so that the existence of object 900 is detected.

Upon detecting the existence of object 900 or receiving an external grip command, an external controller or an operator sends back control signals to activate the present invention. Specifically, the membrane wall 510 is firstly lowered by the actuation mechanism 641 and the pressure mechanism 600 is turned on such that the region of the membrane 300 that is near the rim of the membrane wall 510 is pushed against the object 900 while at the same time volume of the membrane compartment 100 is reduced. This increases the air pressure inside the membrane compartment 100 and causes the membrane 300 to bulge out, conforming to the shape of the object and sealing the opening 400 of the suction compartment 200. As the pressure mechanism 600 is turned on, the suction compartment 200 is evacuated by the pressure mechanism 600. Friction, suction, and possibly mechanical interlocking between the membrane 300 and the object 900 are thus induced. The suction wall 500 or the hollow shaft is then or at the same time raised by the other linear actuator 642, bringing the region of the membrane 300 near the suction wall 500 attachment point with it, further increasing suction, friction, and possibly mechanical interlocking effect for gripping.

At this moment, if there is minor leakage of air from the environment into the suction compartment 200, the pressure mechanism 600 can maintain the negative pressure inside the suction compartment 200 sufficiently strong to maintain suction. This is one major advantage of the present invention compared to existing flexible grippers, which cannot maintain suction due to the lack of a negative pressure generating mechanism such as the pressure mechanism 600. The present invention will now have a firm grip on the object 900. To release the object 900, the suction wall 500 is lowered by the linear actuation mechanism 642 and the pressure mechanism 600 is deactivated. Then, or at the same time, the membrane wall 510 is retracted up to separate the membrane 300 from the object 900. At the same time the solenoid valve 647 opens briefly to equalize the pressure between the membrane compartment 100 and the environment, then closes again. This concludes the gripping cycle.

Figures 18, 19, 20, 21:
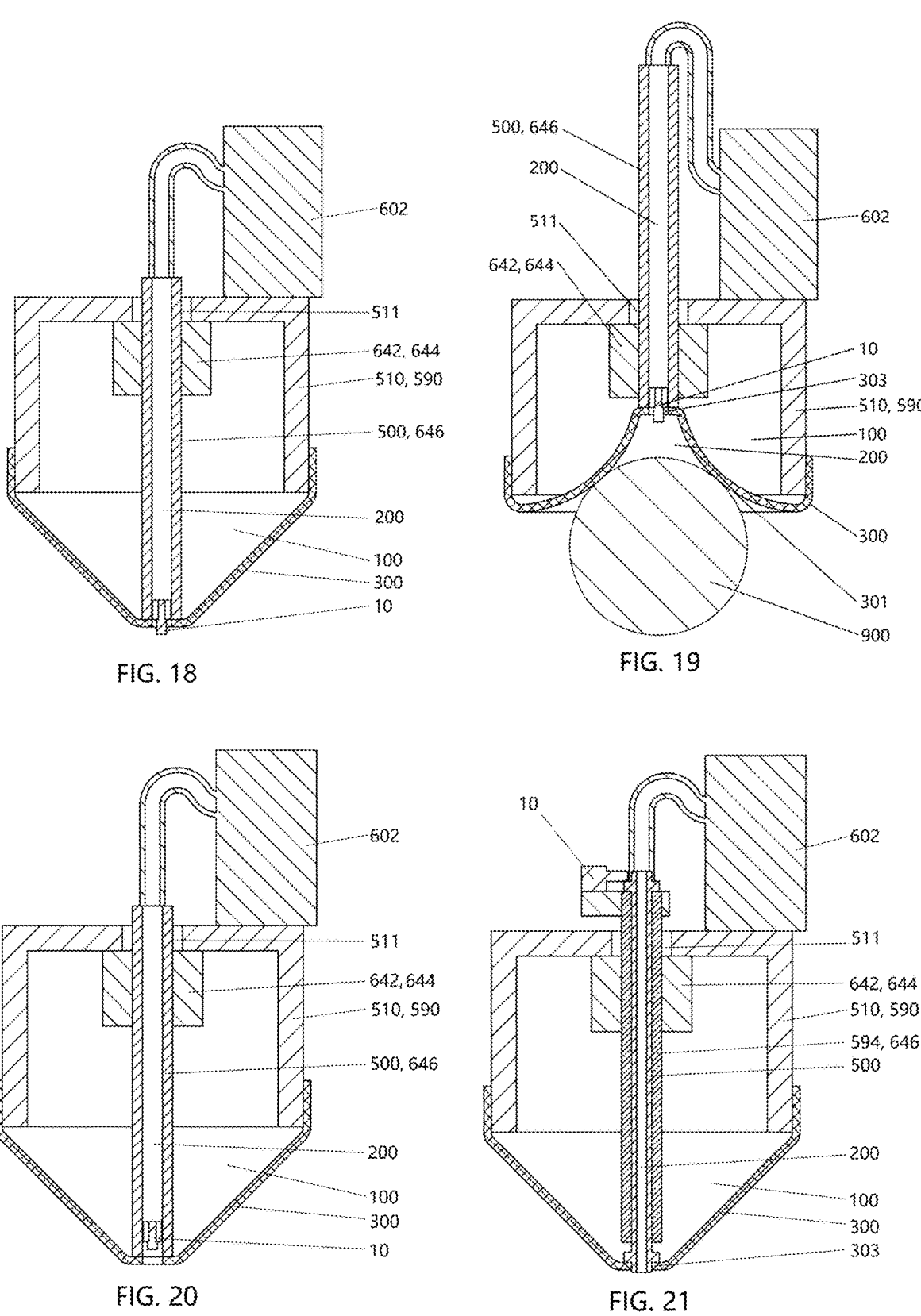
FIG. 18 is a cross-section of the front perspective view of the present invention.
FIG. 19 is a cross-section of the front perspective view of the present invention.
FIG. 20 is a cross-section of the front perspective view of the present invention.
FIG. 21 is a cross-section of the front perspective view of the present invention.

Another embodiment of the present invention is shown in FIGS. 18 & 19, where FIG. 18 shows the device in a resting position whilst FIG. 19 shows the device in a gripping state. This embodiment differs from the embodiments shown in FIGS. 15-17 that it has only one actuation mechanism 642 that is attached to the suction wall 500, and the membrane wall 510 is attached to the framing structure 590 directly. As a result, it works similarly to the implementation in FIGS. 15-17 except that in order to bring the membrane 300 close to the object 900, the whole device must be moved towards the object 900 at a set speed while at the same time the suction wall 500 needs to be retracted by the actuation mechanism 642 away from the object 900 at the same speed to prevent it from crushing into the object 900. Also, a sensor 10 is affixed to the tip of the suction wall 500 configured to detect the existence of the object 900 directly once it is in contact with the object 900, and whose output can be used to trigger the gripping operation of the present invention. A non-contacting sensor 10 that detects the existence of the object 900 directly can also be used as shown in FIG. 20. Alternatively, a sensor 10 that detects the interaction between membrane and object indirectly, hence the existence of the object, can be integrated into the adaptable suction device as shown in FIG. 21 in the same way as in the embodiment shown in FIGS. 15-17.

Figures 22, 23, 24, 25:
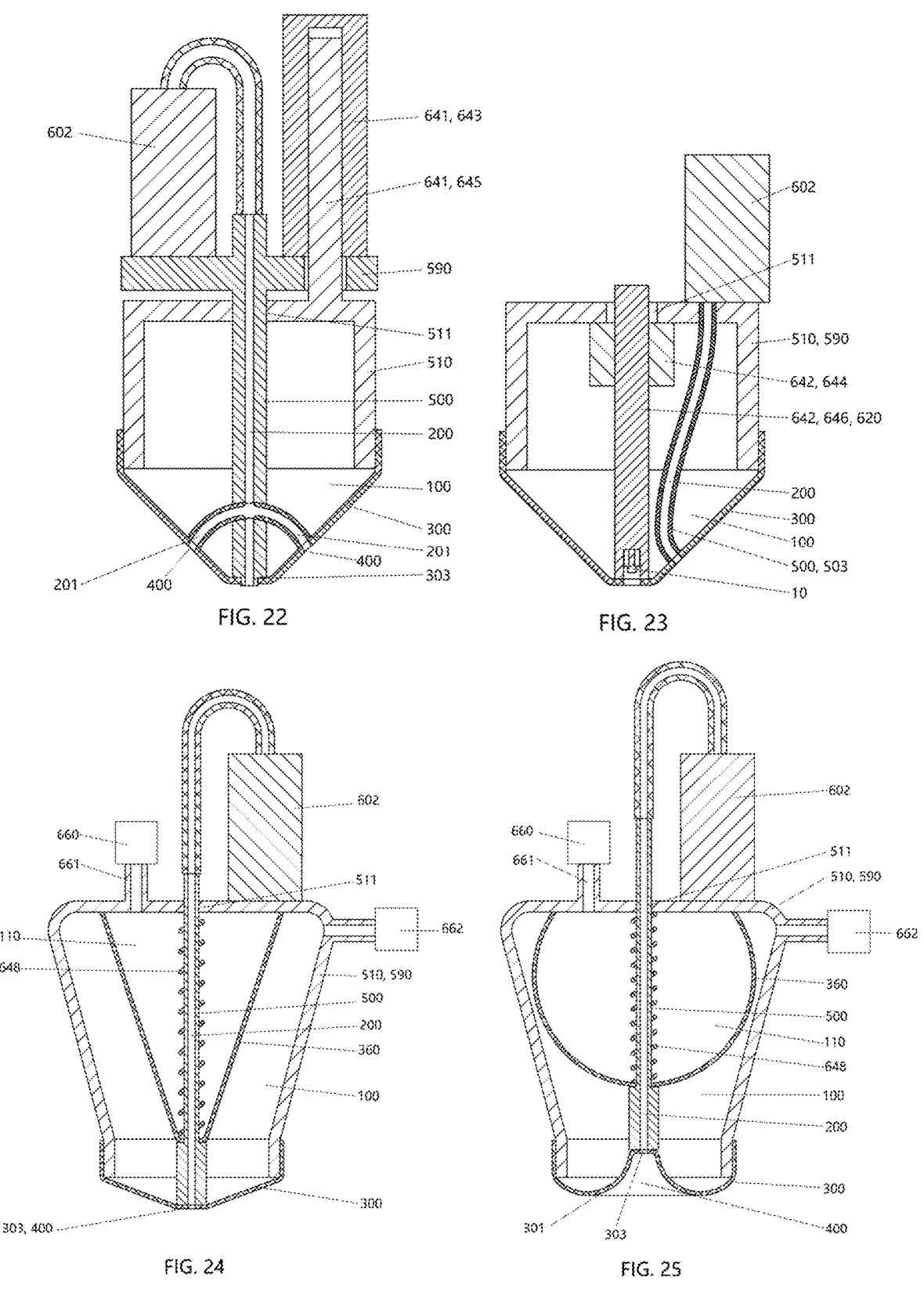
FIG. 22 is a cross-section of the front perspective view of the present invention.
FIG. 23 is a cross-section of the front perspective view of the present invention.
FIG. 24 is a cross-section of the front perspective view of the present invention.
FIG. 25 is a cross-section of the front perspective view of the present invention.

Another embodiment of the present invention is shown in FIG. 22. This embodiment is similar to the embodiment shown in FIGS. 18-20 except that the suction compartment 200 is arranged differently, with multiple branches 201 reaching different openings 400 on the membrane 300, and that the suction wall 500 is fixed to the framing structure 590 whilst the membrane wall 510 is attached to the actuation mechanism 641. Since the suction wall 500 is fixed to the framing structure 590, to bring the membrane 300 hence the suction wall 500 away from the object 900, the whole device needs to be brought away from the object 900 whilst the actuation mechanism 641 is activated to push the membrane wall 510 towards the object 900 relative to the suction wall 500, thus maintaining the relative position between the membrane wall 510 and the object 900.

Another embodiment of the present invention is shown in FIG. 23. This embodiment is similar to the embodiment shown in FIG. 20 except that the suction wall 500 delimiting the suction compartment 200 comprises a flexible tube 503, whilst the movable component of 646 of the actuation mechanism 642 is directly connected to the membrane 300, providing a force 620 to displace it.

Another embodiment of the present invention is shown in FIGS. 24 & 25. In this embodiment, an alternative form of actuation mechanism is used. Specifically, an additional membrane 360 forms a part of the boundary for the membrane compartment 100, and the space above membrane 360 and delimited by it and the membrane wall 510 is another compartment 110. The compartment 110 is filled with a fluid. A suction wall 500 in the form of a free hanging shaft is attached to both membranes 300 and 360 and goes through a hole 511 with rod seal at the top of wall 510. The membrane compartment 100 is also filled with a fluid that can be the same or different from the fluid that fills compartment 110. A contrivance such as a spring 648 is used to bring the suction wall 500 or the shaft to a fixed position when the device is at rest, therefore bringing both membrane 300 and membrane 360 to specific shapes in the resting state as shown in FIG. 24.

An actuation mechanism 660 in the form of a pressure source or a fluid source/sink is connected to compartment 110 via a passage 661. By changing the pressure and/or the amount of fluid in compartment 110, the shape of compartment 110 can change, thus forcing the suction wall 500 to move and the membrane 300 to change shape to grip the object 900. At the same time, the pressure mechanism 602 can evacuate compartment 200 to provide suction as in FIG. 25. As in previous embodiments, one or more sensors 10 can be incorporated to detect the existence of objects 900 within reach of the present invention. Such sensors 10 are not shown in FIG. 24 or FIG. 25. An optional flow control component 662, e.g. a valve to the environment, a pressure source, or a fluid source/sink, can also be incorporated to the membrane compartment 100 to compensate for leakage or provide additional degree of freedom for controlling the operation of the present invention.

Figures 26, 27:
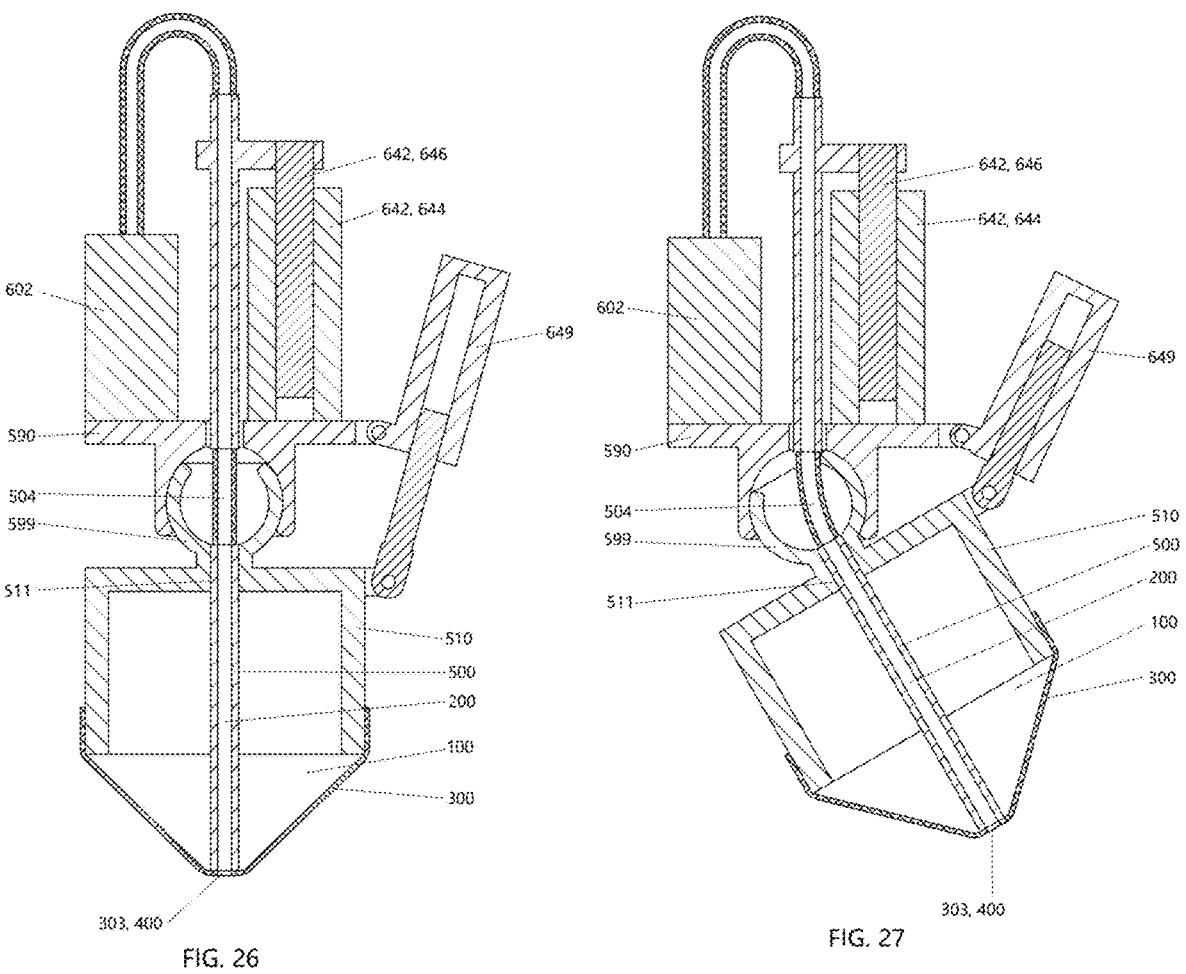
FIG. 26 is a cross-section of the front perspective view of the present invention.
FIG. 27 is a cross-section of the front perspective view of the present invention.

Another embodiment of the present invention is shown in FIGS. 26 and 27. This embodiment comprises a pressure mechanism 602, a membrane compartment 100 delimited by a membrane wall 510, a suction wall 500, a membrane 300, and two or more actuation mechanism 642 and 649. The membrane wall 510 is connected to the framing structure 590 in such way that it can be rotated relative to the framing structure, e.g. via a joint 599, and the whole or a part 504 of the suction wall 500 is non-rigid, so that the orientation of the membrane wall 510, the suction wall 500, and the membrane 300, hence the orientation of the membrane compartment 100 and the suction compartment 200 can be adjusted by one or more actuation mechanism 649. FIGS. 26 & 27 show the embodiment with the membrane compartment 100 and suction compartment 200 moving in different directions. The joint 599 may further comprise a ball joint, cardan joint, or bellow.

Figures 28, 29:
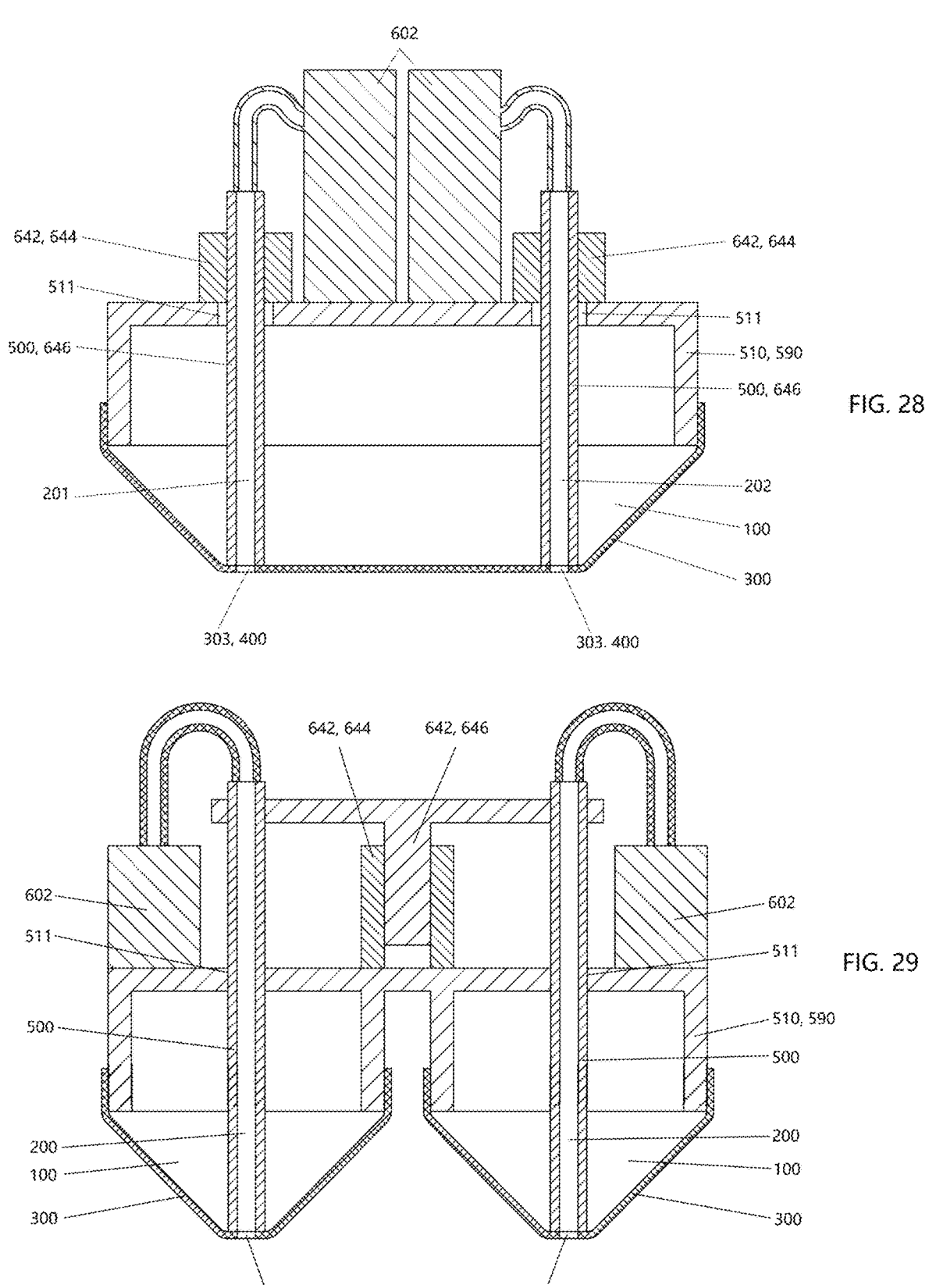
FIG. 28 is a cross-section of the front perspective view of the present invention.
FIG. 29 is a cross-section of the front perspective view of the present invention.

Another embodiment of the present invention is shown in FIG. 28. In this embodiment, at least two actuation mechanism 642 are used to change the shape of one membrane 300 via two suction walls 500. Two pressure mechanisms 602 are connected to two suction compartments 201 and 202, such that the deformation of the membrane 300 and the strength of suction in suction compartments 201 and 202 can be adjusted independently.

Another embodiment of the present invention is shown in FIG. 29. In this embodiment, one actuation mechanism 642 is used to change the shape of at least two membranes 300 through a branched suction wall 500. The two membranes 300 can be of different positions, orientations, constructions, sizes, shapes, and they can reside in different membrane compartments 100 or the same membrane compartment 100.

Figures 30, 31, 32A, 32B, 33A, 33B, 34A, 34B:
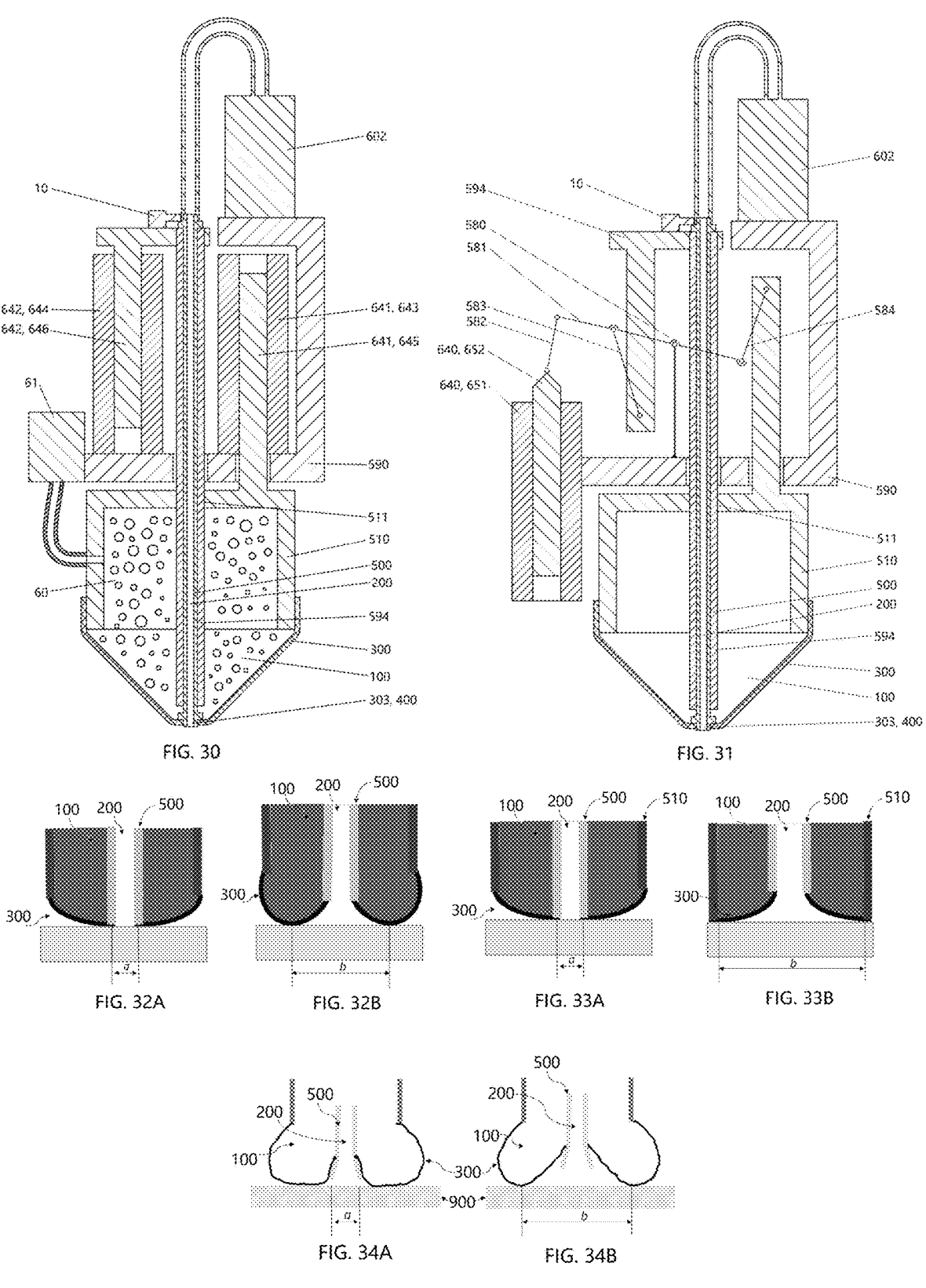
FIG. 30 is a cross-section of the front perspective view of the present invention.
FIG. 31 is a cross-section of the front perspective view of the present invention.
FIG. 32A is a cross-section of the front perspective view of the present invention.
FIG. 32B is a cross-section of the front perspective view of the present invention.
FIG. 33A is a cross-section of the front perspective view of the present invention.
FIG. 33B is a cross-section of the front perspective view of the present invention.
FIG. 34A is a cross-section of the front perspective view of the present invention.
FIG. 34B is a cross-section of the front perspective view of the present invention.

Another embodiment of the present invention is shown in FIG. 30. This embodiment is the same as the one shown in FIG. 15 except that the membrane compartment 100 is filled with a substance 60 comprising one or a combination of the following materials: a fluid, a granular material, a phase-changing material, compressible solids, or other material that enables such a compartment to change shape. As a result, the substance 60 can be affected to make one or more of its following properties vary: stiffness, phase, and volume. And an actuation mechanism 61 is used to induce the said property variations of the said substance 60 in the membrane compartment 100 via at least one of the following changes inside the membrane compartment 100: variation of temperature, variation of pressure, including generation of negative pressure, variation of an electric field, variation of a magnetic field, vibration. If the type of variation is the generation of negative pressure, a separate pressure mechanism 600 or the same pressure mechanism 600 that is connected to the suction compartment 200 can be used. If the type of property variation in the substance 60 is the variation in stiffness, during gripping, in addition to the aforementioned sequence of operations regarding FIGS. 15-17, the actuation mechanism 61 is activated such that the substance 60 in membrane compartment 100 stiffens, thereby confining the shape of the membrane 300 to a fixed shape that is conforming to the shape of the object 900. Such fixed shape of the membrane can induce friction and mechanical interlocking effects for grasping the object 900.

Another embodiment of the present invention is shown in FIG. 31. This embodiment is the same as the one shown in FIG. 15 except that the suction wall 500 and the membrane wall 510 are actuated by a single actuation mechanism 640 that comprises a static component 651 and a movable component 652. Specifically, the static component of the actuation mechanism 651 is fixed to the framing structure 590. The movable component of the actuation mechanism 652, the intermediate component 594 relative to which the suction wall 500 can move within a small range, and the membrane wall 510 are connected through three links 582, 583, and 584 to a lever 581. The lever 581 can rotate around a pivot 580 that is fixed to the framing structure 590. So that as the movable component of the actuation mechanism 652 extends relative to the static component 651, the lever 581 is pushed by the link 582 to rotate clockwise around the pivot 580. Consequently, the link 583 pulls the intermediate component 594, hence the suction wall 500 up relative to the framing structure 590, and the link 584 pushes the membrane wall 510 down relative to the framing structure 590. And conversely, as the movable component of the actuation mechanism 652 retracts relative to the static component 651, the lever 581 rotate counter clockwise around the pivot 580, bring the wall 500 down and the wall 510 up relative to the framing structure 590.

In another embodiment, the shape of the membrane 300 is changed in order to obtain a variable suction-cup effect. Specifically, the method consists in increasing or decreasing the perimeter of the membrane 300 in contact with the object 900 to obtain different levels of suction strength. In fact, the force is the pressure times the area. By increasing the perimeter, the area also increases and, for a constant value of pressure, the forces therefore increase as well. It should be noted that, while the perimeter would generally be closed, it could be an open line, or a series of segments, where the sealing is not complete.

A way to implement such a variable suction-cup is to change the pressure inside the membrane compartment 100 or its shape. The change of the shape of the membrane 300 using a pressure mechanism 600 and/or actuation system 630, actuation mechanism 640 and membrane actuation mechanism 650 as discussed in another embodiment or other methods could be obtained. FIGS. 32A & 32B show an implementation for this embodiment. The distance 'a' in FIG. 32A is smaller than distance 'b' in FIG. 32B as a result, for instance, of the inflation of the membrane.

A different implementation can be obtained by changing the relative movement of the structural components delimiting compartments 100 and 200. A related implementation consists of changing the distance of the inner and outer edges of the membrane 300 from the object 900. FIGS. 33A & B show an example of such implementation. The distance 'a' in FIG. 33A is smaller than distance 'b' in FIG. 33B as a result of changing the relative distance of the suction wall 500 and membrane wall 510 from the object 900.

FIG. 34 shows an example where the suction wall 500 is moved and the membrane 300 is deformed such as the distance 'a' in FIG. 34A and distance 'b' in FIG. 34($b$) are different.

Figures 35A, 35B, 36A, 36B, 37A, 37B:
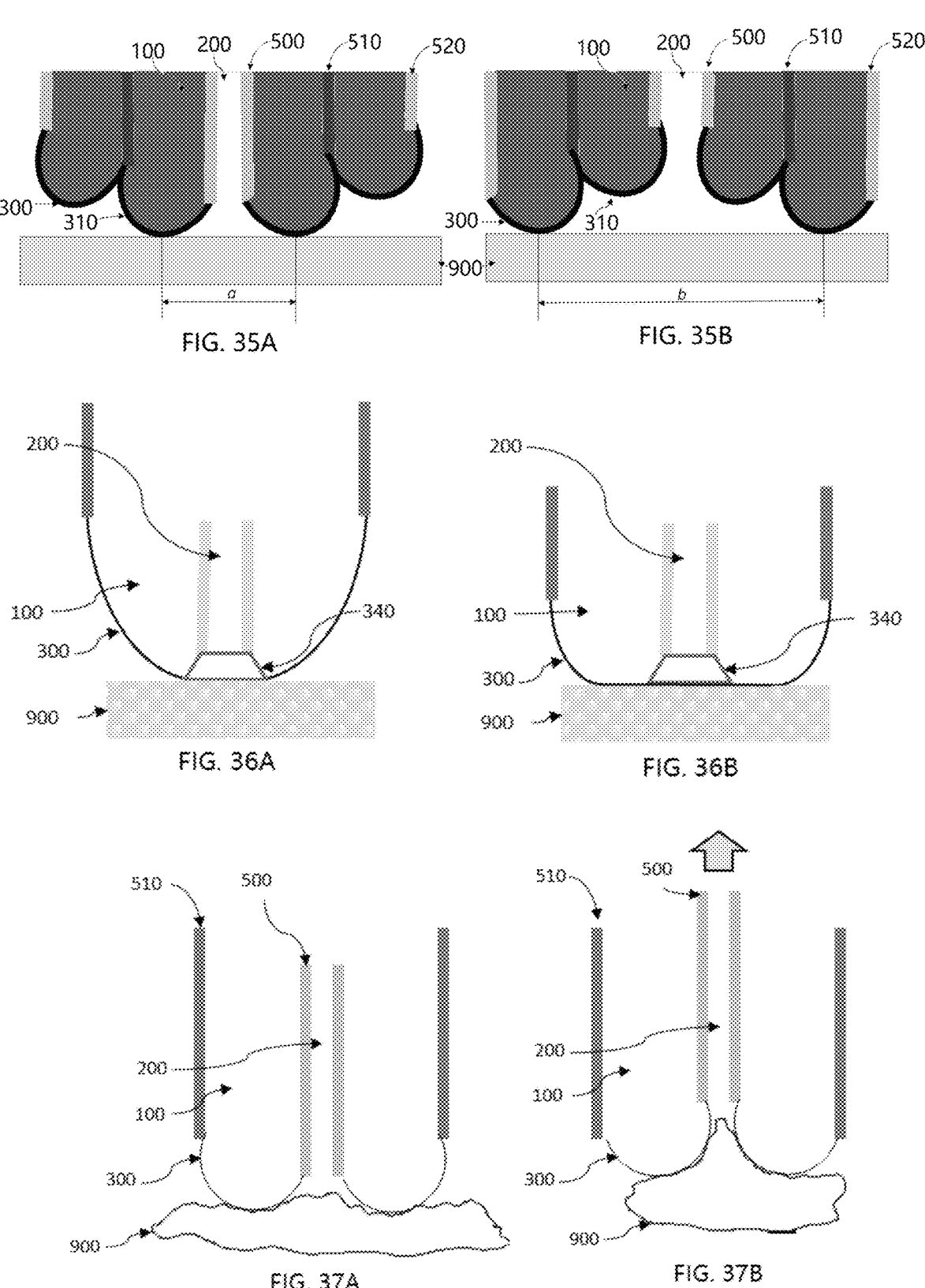
FIG. 35A is a cross-section of the front perspective view of the present invention.
FIG. 35B is a cross-section of the front perspective view of the present invention.
FIG. 36A is a cross-section of the front perspective view of the present invention.
FIG. 36B is a cross-section of the front perspective view of the present invention.
FIG. 37A is a cross-section of the front perspective view of the present invention.
FIG. 37B is a cross-section of the front perspective view of the present invention.
Figures 38A, 38B, 38C, 38D, 38E, 38F, 38G, 38H, 39A, 39B:
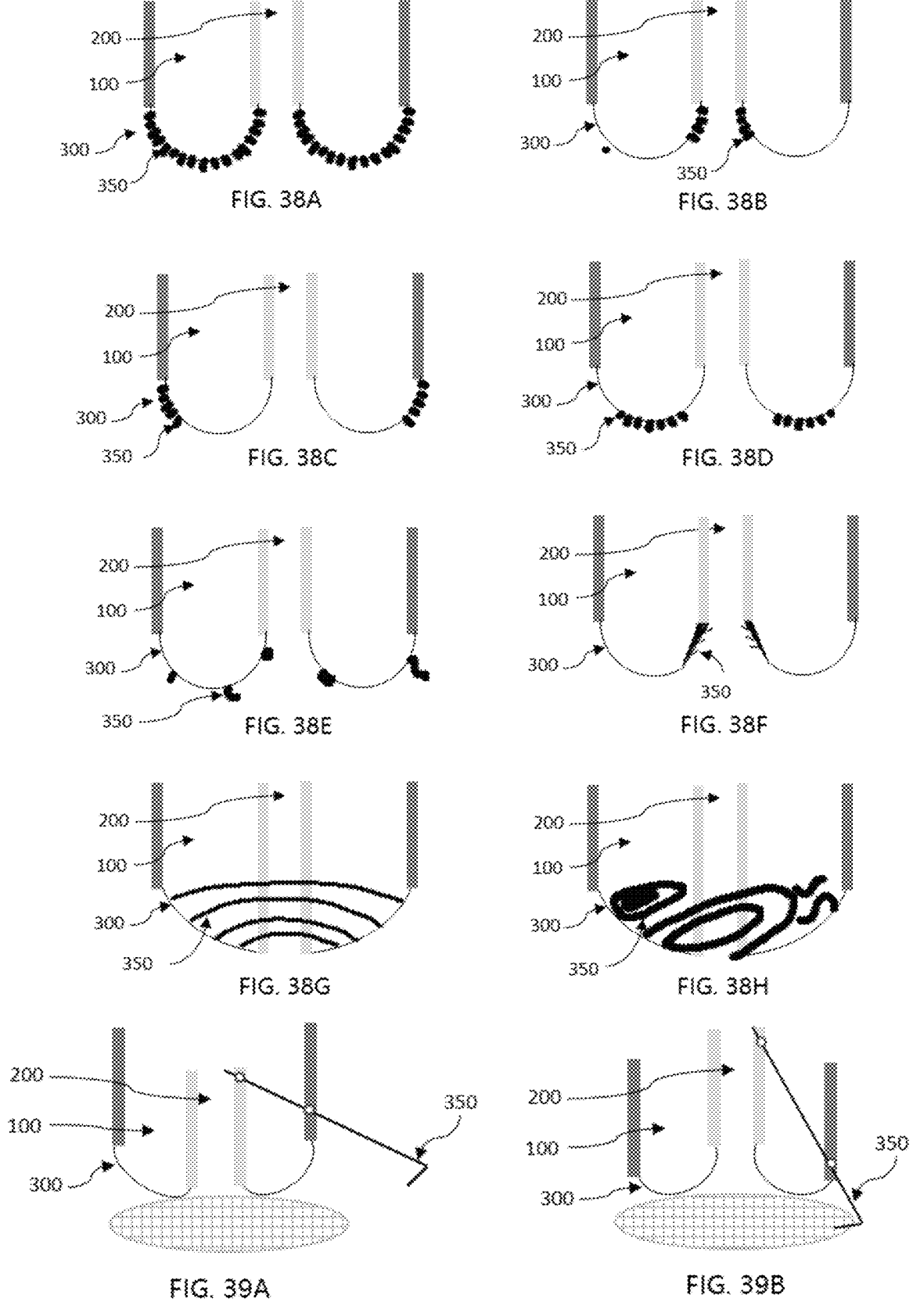
FIG. 38A is a cross-section of the front perspective view of the present invention.
FIG. 38B is a cross-section of the front perspective view of the present invention.
FIG. 38C is a cross-section of the front perspective view of the present invention.
FIG. 38DD is a cross-section of the front perspective view of the present invention.
FIG. 38E is a cross-section of the front perspective view of the present invention.
FIG. 38F is a cross-section of the front perspective view of the present invention.
FIG. 38G is a cross-section of the front perspective view of the present invention, where some protrusions are shown in the front perspective view.
FIG. 38H is a cross-section of the front perspective view of the present invention, where some protrusions are shown in the front perspective view.
FIG. 39A is a cross-section of the front perspective view of the present invention.
FIG. 39B is a cross-section of the front perspective view of the present invention.

In yet another implementation, a number of different compartments and membranes are used where the relative movement of the structural components delimiting the different compartments change the perimeter of contact between the membrane and the object. FIGS. 35A & 35B show an implementation where the walls 500, 510 and 520 defining three compartments have different distances from the object 900. Such different distances enable the distance 'a' in FIG. 35A to be smaller than distance 'b' in FIG. 35B. A single membrane or different membranes (membranes 300 and 310 are shown in FIG. 35) can be used.

A combination of the above-mentioned embodiments can be used to create a variable suction-cup effect. For instance: the compartments do not move and the shape of the membrane is changed, the compartments do not move and the pressure inside at least one compartment is changed, at least one compartment moves; and the pressure inside at least one compartment is changed and at least one compartment moves.

A variable suction cup can be obtained by the use of at least one actuation mechanism and/or by varying the force the device applies against the object 900.

In another embodiment, the device can increase or decrease the effectiveness of the sealing by changing the shape of the membrane 300. For instance, comparing FIG. 36A and FIG. 36B, a better sealing may be obtained by increasing the contact surface area between the membrane 300 and the object 900.

In another embodiment, the device induces the object 900, or a portion of the object 900, to have an inward movement in the device. Such a motion can be induced in a number of ways, including the relative motion of the compartments 100, 200, the use of the actuation mechanism 630, 640, 650, 660, or other means. Such a motion can also be induced by pressing the device against the object 900.

Depending on the shape, material, and properties of the object, this relative motion can assist either to increase the friction between the membrane 300 and the object 900, or improve the sealing between the membrane 300 and the object 900, or both increase the friction and improve the sealing between the membrane 300 and the object 900. FIGS. 37A and 37B show a schematic representation in the specific case where the movement of the suction wall 500 facilitates the object 900 to have an inward movement. Alternative embodiments can be obtained by moving the wall 510 or sequentially or simultaneously moving the walls 510 and 500. This embodiment is particularly suitable for objects 900 inside a bag, such as plastic bag, perforated plastic bag, meshed bags, or small objects, such as a pen, a nut, a bolt, or objects having spiky shapes, such a brush, or being soft, such as a sponge. This inward movement can facilitate grasping, friction, pinching, suction, or other ways to exert a force to the object.

In another embodiment, the actuation mechanism creates an inward movement of the membrane 300. In another embodiment, the force generated by the interaction between the device and the object 900 can create a movement of the object 900 in the device.

In another embodiment, the device includes protrusions 350 that assist engaging objects 900. These protrusions may have the shape of claws, spines, spikes, bumps, hooks, cubes, spheres, studs, ridges, textures, ribbed lines, or have other shapes. The protrusions can be complicated shapes which may be connected to other elements of the device or could be an integral part of such other elements. The membrane can present such protrusions. The protrusions can be evenly distributed or cover only a portion of the membrane. They can be randomly distributed on the membrane 300. The protrusions can be made of the same material of the membrane 300 (e.g. the membrane presents protrusions) or different materials. The membrane 300 nearby the protrusions might be thicker or made of a different material than the remaining portions of the membrane 300 to support stress these protrusions may create.

Figures 40A, 40B, 41, 42, 43, 44, 45A, 45B, 46A, 46B:
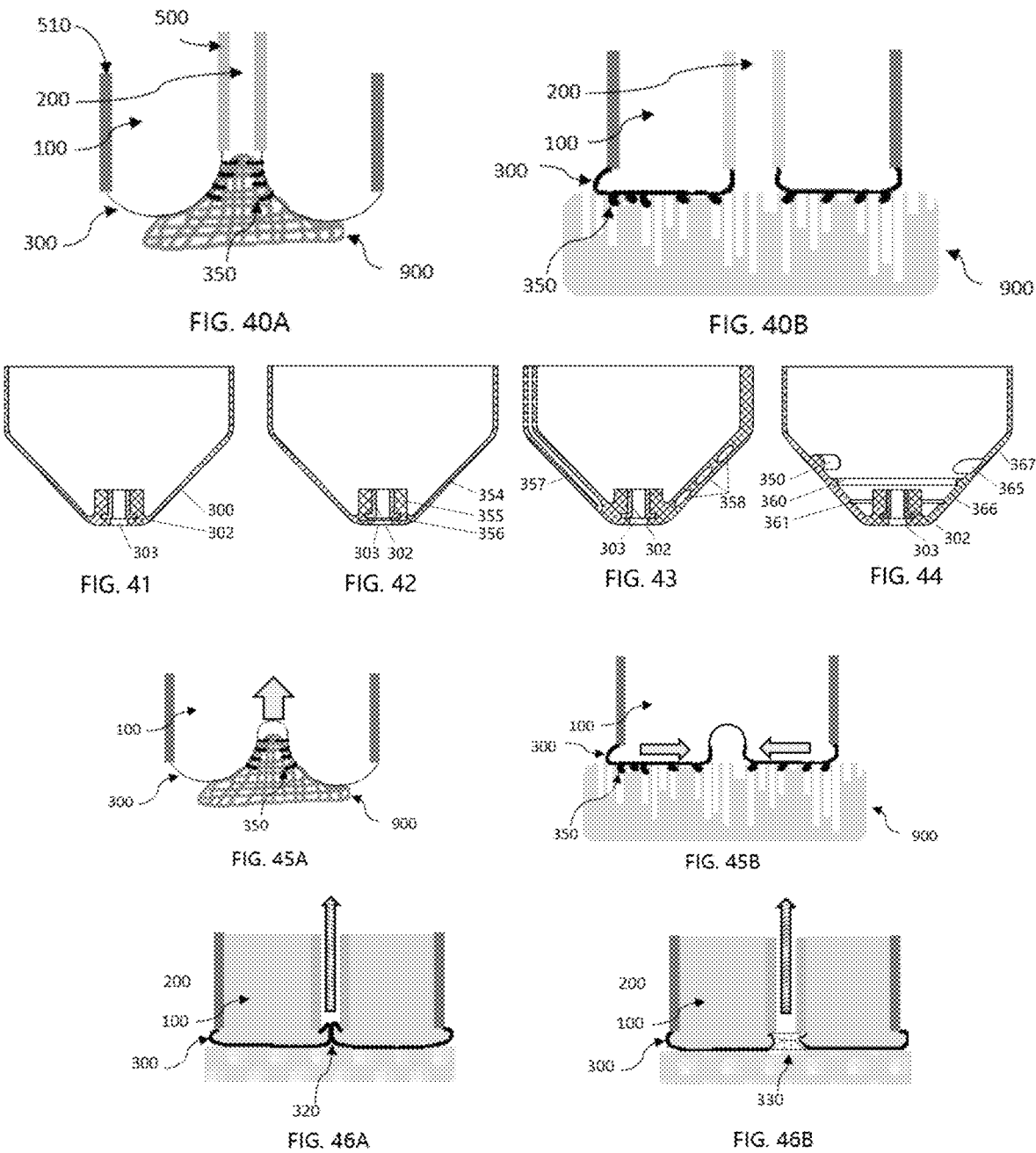
FIG. 40A is a cross-section of the front perspective view of the present invention.
FIG. 40B is a cross-section of the front perspective view of the present invention.
FIG. 41 is a cross-section of the front perspective view of a membrane of the present invention.
FIG. 42 is a cross-section of the front perspective view of a membrane of the present invention.
FIG. 43 is a cross-section of the front perspective view of a membrane of the present invention.
FIG. 44 is a cross-section of the front perspective view of a membrane of the present invention.
FIG. 45A is a cross-section of the front perspective view of the present invention.
FIG. 45B is a cross-section of the front perspective view of the present invention.
FIG. 46A is a cross-section of the front perspective view of the present invention.
FIG. 46B is a cross-section of the front perspective view of the present invention.

FIGS. 38A-38H illustrate examples of the protrusions on the membrane 300. FIGS. 39A and 39B show a protrusion 350 which is not connected to the membrane 300. The protrusions are particularly well suited to assist engaging objects 900 which are porous or having shapes or mechanical properties which facilitate protrusions to increase the grip. Such objects 900 may include plastic mesh bags, textile-based objects, sponges, bricks, pumice-based objects, and others. FIGS. 40A and 40B show some examples where protrusions increase the grip.

The membrane 300 may have a variable stiffness and shape. For instance, it could take the form of a suction cup and its lid could then extend to form a thin membrane 300. In another instances, the membrane 300 has variable thickness as shown in the last picture of FIG. 3F.

Another embodiment of the membrane 300 is shown in FIG. 41. In this embodiment, the membrane 300 is of a monolithic structure. The composition of the membrane 300 can be uniform or varying continuously from one part to the other parts of the membrane 300. Optional contrivances such as threaded inserts 302 for attaching to the gripping device can be added.

Another embodiment of the membrane 300 is shown in FIG. 42. In this embodiment, the membrane 300 comprises regions made of different materials, with distinct boundaries between the regions. For example, in FIG. 21, the membrane body 354 and the boss 355 for fitting the threaded insert are made of two different materials with a distinct boundary 356 between them.

Another embodiment of the membrane is shown in FIG. 43. In this embodiment, one or more holes 357 and/or cavities 358 are built into the membrane. The hole 357 can be used as part of the compartment 200. The hole 357 can also serve other purposes, for instance structural purposes.

Another embodiment of the membrane is shown in FIG. 44. In this embodiment, features such as protrusions 350, dents 365, ridges 360, and/or grooves 361 are built into the membrane 300. Also, the thickness of the membrane 300 varies between different regions 366, 367. The surface texture of the membrane 300 at region 366 can also be different from that at region 367.

In another embodiment, the device has at least a portion of a membrane 300 with at least one protrusion and grasps without the use of suction. It should in fact be noted that the presence of protrusions may create enough friction, interlocking or other mechanical forces such that suction is not required. The device could in this case consist of a single compartment with a membrane 300. Such a configuration could be used in the case where only objects suitable for being grasped with protrusions are present.

FIGS. 45A and 45B illustrate embodiments where a force is applied to the membrane 300 such that the protrusions engage the object 900 and grasp it. While suction is not used, the device would operate in a very similar manner of the one shown in FIGS. 40A & 40B. In fact, the suction force, which creates a pulling force, is substituted in FIG. 45 by a force which pulls the membrane 300 and enables the protrusions to engage the object 900. In a more general term, the membrane 300 undergoes a force having a component in direction opposite to the object 900.

In another configuration, the membrane 300 slides against the object 900. Such sliding enables the protrusions to engage the object 900. Such a sliding includes rubbing.

In another configuration, two or more membranes, or portions of the same membrane, have a movement in opposite direction with respect to each other. The protrusions of one membrane would therefore pull the object in direction opposite to the protrusions of the other membrane. FIG. 45B shows an example where portions of the same membrane have a movement towards the central axis of the device.

In another configuration, the membrane 300 does not move but exerts forces in the object 900 which are in opposite direction to each other. FIG. 45B shows an example of such a case.

In another embodiment, at least two protrusions exert forces on the object 900 which have components in directions opposite to each other.

A method of grasping where at least a portion of a membrane 300 with at least one protrusion contacts an object 900. The protrusion interacts with the object 900 such that it creates interlocking or other mechanical forces, including friction, which engage the object 900. Such interlocking can be assisted by the movement of the membrane 300 or by the force the membrane 300 exerts to the object 900.

In another embodiment the device includes at least one separator element 330 to prevent components of the device from occluding the suction compartment 200. For instance, the membrane 300 can form an occlusion 320 which limits the flow of air/fluid resulting in a decrease of suction. Such an occlusion could for instance be created by the pressurization of the membrane compartment 100, by the depression of the suction compartment 200, by the object 900, or other reason. FIG. 46A shows an example of occlusion 320 and FIG. 46B shows a separator element 330. The separator element 330 can be perforated, porous or air/watertight, mechanically compliant or stiff, or made of different components (e.g. sliding components). The separator element 330 can be an integral part of a compartment, membrane, actuation mechanism, protrusion or other component of the device.

In another embodiment, the device includes at least a suction cup 340. Such a suction cup can be a distinct element or be an integral part of the membrane 300. It can be connected to the suction wall 500 or membrane wall 510, or other part of the device. FIGS. 47A-47D illustrate examples where the suction cup 340 is attached to the suction wall 500 as in FIGS. 47A & 47B, the membrane wall 510 as in FIG. 47C, or the deformable membrane 300 and the membrane wall 510 in FIG. 47D. The use of multiple suction cups of different sizes can be used to seal small objects as well as large objects.

FIGS. 48A-48C illustrate examples where a suction cup 341 is attached to the membrane wall 510 and a suction cup 342 is attached to the suction wall 500. This configuration is particularly suitable to grasp objects 900 of different sizes and shapes. For instance, the suction cup 341 can be used to grasp objects 900 of large surface area when the air/fluid flow in the suction compartment 200 creates suction as in FIG. 48A; the membrane 300 can grasp objects 900 of irregular shape where suction cups 341 and 342 may fail as in FIG. 48B; and suction cup 342 can grasp flat small objects as in FIG. 48C. The suction cup can be made of different materials, shapes and have different properties. For instance, it could be circular, oval, square, rectangular or other geometry. It could be made of gel, polymer or other material. It could be a perforated membrane. It could be a perforated block. It could be a tube, a truncated cone, have a symmetric or asymmetric geometry or have other shape.

In another embodiment, a method to grasp objects is presented where the suction generated in the suction compartment 200 is used to grasp using the combined use of one membrane 300, an inner suction cup and an outer suction cup.

In another embodiment the separator element 330 and the suction cup 340 are constructed to be a single component. Such a component can be distinct or be an integral part of the membrane 300. It can be porous or air/watertight.

Figures 49A, 49B:
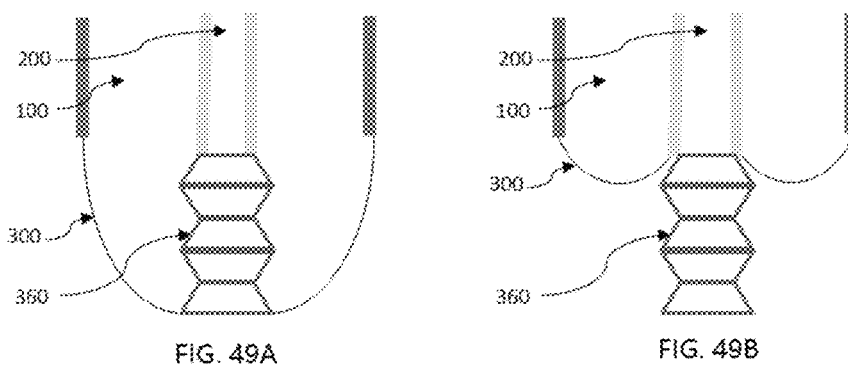
FIG. 49A is a cross-section of the front perspective view of the present invention.
FIG. 49B is a cross-section of the front perspective view of the present invention.
Figures 50, 51, 52:
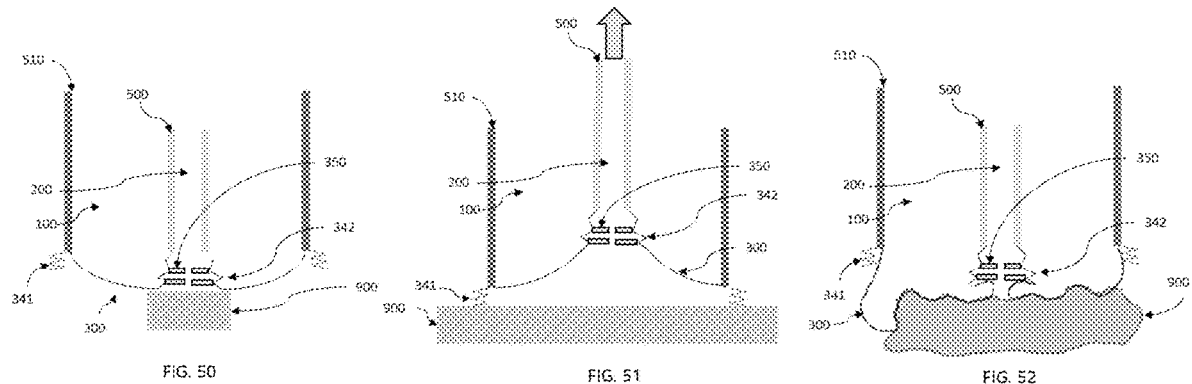
FIG. 50 is a cross-section of the front perspective view of the present invention.
FIG. 51 is a cross-section of the front perspective view of the present invention.
FIG. 52 is a cross-section of the front perspective view of the present invention.
Figure 53:
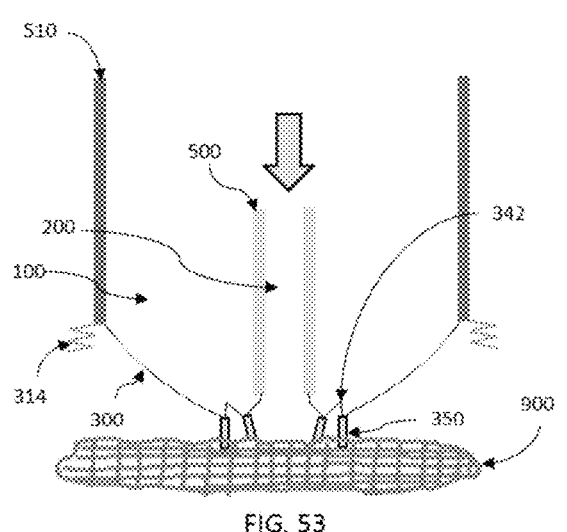
FIG. 53 is a cross-section of the front perspective view of the present invention.

In another embodiment at least one bellow 360 is used. Such a bellow has the primary role to assist the device to conform to the object 900. FIGS. 49A & 49B illustrate examples with bellows. The bellow can have a variety of shapes. Its cross section can be circular, oval, rectangular or other shape, including irregular shapes. The different cross sections along the longitudinal axis can have different shapes. The bellow could have the shape of a sphere or other geometry, including an irregular geometry or a geometry with one or more symmetries.

In another embodiment the separator element 330, the suction cup 340 and/or the bellow 360 have protrusions 350.

In another embodiment, a plurality of suction compartments are used, wherein the deformable membrane further comprises a plurality of apertures configured to receive the plurality of suction compartments such that any pressure changes made within the plurality of suction compartments regulate the gripping or attractive forces. Alternatively, a plurality of membrane compartments are used, wherein the deformable membrane further comprises a plurality of deformable membranes delineating the plurality of membrane compartments.

In another embodiment, at least two elements among the following are combined: at least one membrane; at least one element to prevent occluding the inward flow; at least one suction cup; at least one bellow; at least one compartment; at least one actuation mechanism; and at least one protrusion.

Figure 54:
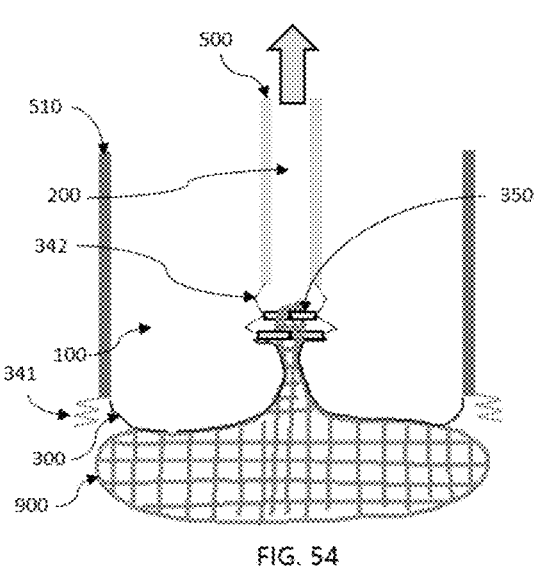
FIG. 54 is a cross-section of the front perspective view of the present invention.

In another embodiment the same device assumes a number of configurations, including, but not limited to: the suction cup 342 grasps an object (FIG. 50); the suction cup 341 grasps an object (FIG. 51); the membrane 300 conforms to the object and grasps it (FIG. 52); at least one protrusion 350 engages an object (FIG. 53); and the membrane pulls the object inward towards the compartment 200 (FIG. 54). This embodiment includes combinations of the previous and other embodiments. It should be noted that some of the configurations mentioned above may overlap. For instance, the second and fifth configurations might be the same and the device may behave differently depending on the characteristics of the object 900. Note that different configurations of the same device are presented in FIGS. 51-54. Note that the membrane 300, the suction cup 342, the protrusions 350, and the bellow can all be combined in a single element. FIGS. 51-54 show a device where the previous elements can conveniently be combined in a single element if desired. Note that such an element may have different thicknesses, roughness and be made of different materials.

In another embodiment, the actuation mechanism is used to expose the protrusion 350 to the object. The actuation mechanism can also be used to retract the protrusions.

In another embodiment a method is proposed whereby the following stages are considered: the pressure mechanism 600 creates a depression in the suction compartment 200; a seal with the object 900 is formed by the suction cup 342, where the suction cup can be an integral part of the membrane 300, have a bellow shape 360 and/or protrusions 350; the suction cup 341 creates a seal over a larger area; the actuation mechanism assists the membrane 300 to conform to the object 900; the actuations mechanism exposes one or more protrusions to the object 900; the actuations mechanism retracts the protrusions to increase their efficacy; and the actuations mechanism creates an inward movement of the object. It should be noted that the method may include only one of the above-mentioned stages. Such stages can be combined in a variety of different chronological orders and also be repeated.

In another embodiment a method to grasp objects is presented where objects are classified in at least two of the following bins: objects best grasped by at least a suction cup 341; objects best grasped by at least a second suction cup 342; objects best grasped by using at least a bellow 360; objects best grasped by at least a membrane 300; objects best grasped using at least a protrusion 350; objects best grasped using friction force objects best grasped using suction; objects best grasped by inducing an inward motion of the object; and objects best grasped by surrounding the object with the membrane.

In another embodiment, ways to grasp objects are based on algorithms to detect features of objects and/or recognize objects 900. Such a method can consist of a lookup table; a machine learning algorithm, including random forest, support vector machine, linear discriminant analysis, neural network, deep neural network, or other machine learning algorithm which can be supervised, unsupervised on based on reinforcement learning; an algorithm that detects flat surfaces; an algorithm to detect edges and/or features of objects; an algorithm based on the weight of the objects, or other algorithm. Such algorithms can be used to identify how to best operate the adaptable device. FIGS. 55A-55C illustrate that the algorithm provides information to the controller of the gripper to grasp an object. Specifically, FIG. 55C shows an example of decision tree based on four bins.

In another embodiment. a method is proposed which combines the method of using different configurations of the present invention with the method of classifying objects 900 in bins and/or the method of using algorithm to detect features of objects and/or recognize objects 900. The device can manually or automatically be reconfigured. In another embodiment, the failure in grasping an object informs the algorithm.

In another embodiment, a method to grasp objects 900 is presented where a suction cup is used as the default grasping method and the membrane 300 is used when the force exerted by the suction cup is not sufficient. Such a membrane 300 could provide auxiliary force to the suction cup or substitute its use. For instance, in the case of a mesh bag, the suction cup may pull the bag inward but it may not exert sufficient force to pick it up. The use of a membrane 300 may provide the needed seal and friction force to perform a successful grasping. FIG. 56 shows an example of the proposed method.

The present invention is configured to operate in air, underwater, and other environments. Furthermore, the present invention is configured to grasp one or a plurality of objects. The suction compartment 200 can be pressurized to facilitate grasping, releasing an object which has been grasped, or for other reasons. The suction compartment 200 can take the form of a simple tube such as an airline or tube where a gas, such as air, or fluid can flow. The compartments 100, 200 can be extremely small or large. The suction compartment 200 may further comprise a suction cup. The suction compartment 200 may further be formed of at least a portion of a membrane. The suction compartment 200 can be a ring. Lastly, the compartments 100, 200 can be formed from the same membrane.

While the above description contains specific details regarding certain elements, sizes, and other teachings, it is understood that embodiments of the invention or any combination of them may be practiced without these specific details. Specifically, although certain shapes and configurations shown, any suitable shape and configuration may be used so long as the membrane 300 assists in providing gripping or attractive forces. These details should not be construed as limitations on the scope of any embodiment, but merely as exemplifications of the presently preferred embodiments. In other instances, well known structures, elements, and techniques have not been shown to clearly explain the details of the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways.

Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A gripping apparatus configured to pick up, manipulate, and release an object, comprising:
   a framing structure;
   a suction compartment;
   a suction wall at least partially surrounding the suction compartment;
   a membrane wall;
   at least one deformable membrane configured to conform to and to grasp the object;
   a suction cup in mechanical communication with said suction wall or said deformable membrane configured to grasp the object;
   at least one membrane wall actuation mechanism adapted to displace the membrane wall relative to the framing structure;
   wherein the deformable membrane has at least one hole which defines an inner edge of the deformable membrane;
   wherein the inner edge of the deformable membrane is in mechanical communication with said suction wall;
   wherein the membrane wall, the suction wall, and the deformable membrane form at least a partially sealed membrane compartment;
   wherein the membrane compartment is filled with a substance;
   at least one pressure mechanism configured to regulate the pressure of the substance in the membrane compartment or at least regulate the pressure of the suction compartment; and
   wherein the gripping apparatus is adapted to grasp objects of different shapes and sizes using at least the suction cup, or at least the deformable membrane, or the combination of the suction cup and the deformable membrane.

2. The apparatus of claim 1, further comprising
   wherein the shape of the deformable membrane is affected by at least the pressure of the substance inside the membrane compartment; and
   wherein said substance is selected from a list consisting of a gas, air, fluid, granular material, compressible solids, and phase-changing materials.

3. The apparatus of claim 1, wherein the membrane compartment is at least pressurized when grasping the object.

4. A gripping apparatus configured to pick up, manipulate, and release an object, comprising:
   a framing structure;
   a suction compartment;
   a suction wall at least partially surrounding the suction compartment;
   a membrane wall;

at least one deformable membrane configured to conform to and to grasp the object;

a suction cup in mechanical communication with said suction wall or said deformable membrane configured to grasp the object;

wherein the deformable membrane has at least one hole which defines an inner edge of the deformable membrane;

wherein the inner edge of the deformable membrane is in mechanical communication with said suction wall;

wherein an outer edge region of the deformable membrane is fixed to the membrane wall by a clip wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment; and wherein the gripping apparatus is adapted to grasp objects of different shapes and sizes using at least the suction cup, or at least the deformable membrane, or the combination of the suction cup and the deformable membrane.

5. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane wall further comprises a hole to accommodate the suction wall and wherein the suction compartment is configured to move within the hole;

wherein the membrane compartment is filled with a substance;

at least one pressure mechanism configured to regulate the pressure of the substance in the membrane compartment or at least regulate the pressure of the suction compartment; and wherein the gripping apparatus is adapted to grasp objects of different shapes and sizes using at least the suction cup, or at least the deformable membrane, or the combination of the suction cup and the deformable membrane.

6. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

wherein grasping with the deformable membrane is at least dependent on the position of the suction cup or engagement of the suction cup with the object;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment; and wherein the gripping apparatus is adapted to grasp objects of different shapes and sizes using at least the suction cup, or at least the deformable membrane, or the combination of the suction cup and the deformable membrane.

7. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment;

wherein the gripping apparatus is adapted to grasp objects of different shapes and sizes using at least the suction cup, or at least the deformable membrane, or the combination of the suction cup and the deformable membrane;

wherein a resting state of the apparatus is defined as a state in which the membrane wall is at a position closest to the framing structure and the suction wall is at a position furthest away from the framing structure;

wherein the edge of the membrane wall that is the furthest away from the framing structure defines a plane and delimits a region on such plane;

wherein when the apparatus is in the resting state, the deformable membrane does not intersect with such region of the plane; and wherein when the apparatus is grasping an object, the deformable membrane intersects with such region of the plane.

8. A gripping apparatus configured to pick up, manipulate, and release an object, comprising:

a framing structure;

a suction compartment;

an actuation mechanism configured to move the suction compartment relative to the framing structure;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment; and wherein the gripping apparatus is adapted to grasp objects of different shapes and sizes using at least the suction cup, or at least the deformable membrane, or the combination of the suction cup and the deformable membrane.

9. The apparatus of claim 8, whereby the position and/or the control effort of the actuation mechanism and the pressure mechanism are based on features of the object.

10. The apparatus of claim 8, whereby the position and/or the control effort of the actuation mechanism and the pressure mechanism is configured by one or more machine learning algorithm, wherein said one or more machine learning algorithm processes data collected by one or more sensors to detect features of the object or recognize the object.

11. The apparatus of claim 10, wherein a negative pressure source or the control effort are controlled to grasp the object.

12. The apparatus of claim 8, whereby the gripping apparatus is configured to:

grasp the object with the suction cup;

grasp the object with an outer suction cup;

grasp the object with the membrane; and grasp the object with the membrane and one of the suction cup and the outer suction cup.

13. The apparatus of claim 8, whereby the position and/or the control effort of the actuation mechanism and the pressure mechanism is configured to:

grasp the object with the suction cup; and grasp the object with the membrane in addition to the suction cup if the forces exerted by the suction cup are not sufficient.

14. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment;

wherein the gripping apparatus is adapted to grasp objects of different shapes and sizes using at least the suction cup, or at least the deformable membrane, or the combination of the suction cup and the deformable membrane; and wherein the pressure inside the membrane compartment is affected by the at least one pressure mechanism and the pressure of the suction compartment is affected by at least another pressure mechanism, wherein the two pressure mechanisms are independently controlled.

15. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment;

wherein the gripping apparatus is adapted to grasp objects of different shapes and sizes using at least the suction cup, or at least the deformable membrane, or the combination of the suction cup and the deformable membrane; and wherein the apparatus facilitates the movement of the membrane wall and the suction wall relative to the framing structure, and respective to each other, wherein respective to each other comprises one item moves and the other item stays stationary, or both items move.

16. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

at least one outer suction cup in mechanical communication with the outside of and surrounding the membrane wall;

wherein the outer suction cup forms one large suction cup surrounding the membrane wall;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment; and wherein the gripping apparatus is adapted to grasp objects of different shapes and sizes using at least the suction cup, or at least the deformable membrane, or at least the outer suction cup, or any combination of the suction cup, deformable membrane, and outer suction cup.

17. The apparatus of claim 16, wherein the outer suction cup is at least in fluid communication with the pressure mechanism configured to regulate the pressure of the suction compartment.

18. The apparatus of claim 16, wherein upon the at least one outer suction cup contacting the object to be grasped, the at least one outer suction cup delimits at least one sealing region between the outer suction cup and the object;

wherein the shape and area of the at least one sealing region is dependent on the shape of the at least one deformable membrane; and wherein when said gripping apparatus is grasping an object, at least the suction cup in mechanical communication with the suction wall or at least the outer suction cup or at least the deformable membrane, or any combination of the suction cup, the outer suction cup, and the deformable membrane simultaneously creates the sealing region.

19. The apparatus of claim 16, wherein the operation of the outer suction cup is dependent on the position of the suction cup relative to the outer suction cup, the pressure of the suction compartment, the pressure of the membrane compartment, and position and shape of the deformable membrane.

20. The apparatus in claim 16, further configured to operate the apparatus in a membrane mode, a suction cup mode, and a rim cup mode;

wherein the membrane mode is configured for grasping with the deformable membrane and the suction cup;

wherein the suction cup mode is configured for grasping with only the suction cup; and wherein the rim cup mode is configured for grasping with only the outer suction cup.

21. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment;

wherein the gripping apparatus is adapted to grasp objects of different shapes and sizes using at least the suction cup, or at least the deformable membrane, or the combination of the suction cup and the deformable membrane;

further configured to operate the apparatus in a membrane mode and a suction cup mode;

wherein the membrane mode is configured for grasping with the deformable membrane and the suction cup; and wherein the suction cup mode is configured for grasping with only the suction cup.

22. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

wherein the membrane compartment is formed by the membrane wall, suction wall, and deformable membrane whereby the deformable membrane is flexibly connected to the membrane wall and suction wall;

at least one pressure mechanism configured to regulate the pressure of the substance in the membrane compartment or at least regulate the pressure of the suction compartment; and wherein the gripping apparatus is adapted to grasp objects of different shapes and sizes using at least the suction cup, or at least the deformable membrane, or the combination of the suction cup and the deformable membrane.

23. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment;

wherein the gripping apparatus is adapted to grasp objects of different shapes and sizes using at least the suction cup, or at least the deformable membrane, or the combination of the suction cup and the deformable membrane; and wherein when at least the suction cup or at least the deformable membrane is in contact with the object, the at least one pressure mechanism forms a vacuum or a secure suction force to lift the object.

24. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment;

wherein the gripping apparatus is adapted to grasp objects of different shapes and sizes using at least the suction cup, or at least the deformable membrane, or the combination of the suction cup and the deformable membrane; and further comprising a venting valve, wherein the venting valve and the at least one pressure mechanism are configured to regulate the membrane compartment to different pressure set points.

25. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

a variable suction cup, wherein the changes in shape of the deformable membrane will increase or decrease the size of the variable suction cup;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment; and wherein the gripping apparatus is adapted to grasp objects of different shapes and sizes using at least the suction cup, or at least the deformable membrane, or the combination of the suction cup and the deformable membrane.

26. A gripping apparatus configured to pick up, manipulate, and release an object, comprising:

a framing structure;

a suction compartment;

a suction wall at least partially surrounding the suction compartment;

a membrane wall;

at least one deformable membrane configured to conform to and to grasp the object;

a suction cup in mechanical communication with said suction wall or said deformable membrane configured to grasp the object;

wherein the deformable membrane has at least one hole which defines an inner edge of the deformable membrane;

wherein the inner edge of the deformable membrane is in mechanical communication with said suction wall;

wherein the membrane wall, the suction wall, and the deformable membrane form at least a partially sealed membrane compartment;

wherein the membrane compartment is filled with a substance;

at least one pressure mechanism configured to regulate the pressure of the substance in the membrane compartment or at least regulate the pressure of the suction compartment;

wherein the gripping apparatus is adapted to grasp objects of different shapes and sizes using at least the suction cup, or at least the deformable membrane, or the combination of the suction cup and the deformable membrane; and wherein the shape of the deformable membrane is affected by at least the pressure of the substance inside the membrane compartment.

\* \* \* \* \*